US009832611B2

United States Patent
Horn et al.

(10) Patent No.: US 9,832,611 B2
(45) Date of Patent: Nov. 28, 2017

(54) METHOD AND BASE STATION FOR ROUTING MESSAGES OF A POSITIONING PROTOCOL IN A WIRELESS NETWORK

(71) Applicant: QUALCOMM Incorporated, San Diego, CA (US)

(72) Inventors: Gavin Bernard Horn, La Jolla, CA (US); Parag Arun Agashe, San Diego, CA (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/050,117

(22) Filed: Feb. 22, 2016

(65) Prior Publication Data

US 2016/0174041 A1    Jun. 16, 2016

Related U.S. Application Data

(62) Division of application No. 12/985,551, filed on Jan. 6, 2011, now Pat. No. 9,270,587.
(Continued)

(51) Int. Cl.
*H04B 7/00* (2006.01)
*H04W 36/00* (2009.01)
(Continued)

(52) U.S. Cl.
CPC .......... *H04W 4/025* (2013.01); *H04L 45/021* (2013.01); *H04L 45/566* (2013.01); *H04W 4/02* (2013.01); *H04W 4/021* (2013.01); *H04W 8/08* (2013.01)

(58) Field of Classification Search
CPC .... H04W 4/02; H04W 36/0055; H04W 16/16
(Continued)

(56) References Cited

U.S. PATENT DOCUMENTS 6,317,421 B1    11/2001  Wilhelmsson et al.
6,898,425 B1     5/2005  Wilhelmsson et al.
(Continued)

FOREIGN PATENT DOCUMENTS

EP       1526749 A2    4/2005
JP    2011519505 A     7/2011
(Continued)

OTHER PUBLICATIONS

3rd Generation Partnership Project; Technical Specification Group Radio Access Network Evolved Universal Terrestrial Radio Access (E-UTRA); LTE Positioning Protocol A (LPPa) (Release 9), 3GPP Standard; Access Network Evolved Universal Terrestrial Radio Access (E-UTRA);, 3rd Generation Partnership Project (3GPP), Mobile Competence Centre ; 650, Route Des Lucioles ; F-06921 Sophia-Antipolis Cedex ; France, No. V9.0.0, Dec. 18, 2009 (Dec. 18, 2009), pp. 1-47, XP050401367, [retrieved on Dec. 18, 2009].
(Continued)

*Primary Examiner* — William D Cumming
(74) *Attorney, Agent, or Firm* — Mahmoud Munes Tomeh

(57) ABSTRACT

Methods and apparatuses are provided that facilitate routing of messages of a positioning protocol, such as long term evolution (LTE) positioning protocol annex (LPPa). A positioning server can determine a network area identifier of one or more messages based at least in part on an identifier of a base station associated with the one or more messages. Based at least in part on the network area identifier, the positioning server can provide the one or more messages to an intermediate network node corresponding to the one or more base stations, such as a mobility management entity (MME). MME can similarly provide the one or more messages to an optional gateway between it and the one or more base stations based at least in part on receiving the network area identifier in the one or more messages. In
(Continued)

addition, a base station can update positioning information with the positioning server.

20 Claims, 19 Drawing Sheets

Related U.S. Application Data

(60) Provisional application No. 61/293,534, filed on Jan. 8, 2010.

(51) Int. Cl.
| | |
|---|---|
| H04W 40/00 | (2009.01) |
| H04W 24/00 | (2009.01) |
| H04B 1/38 | (2015.01) |
| H04W 4/02 | (2009.01) |
| H04L 12/755 | (2013.01) |
| H04L 12/721 | (2013.01) |
| H04W 8/08 | (2009.01) |

(58) Field of Classification Search
USPC ......... 455/41.2, 456.2, 436, 445, 456.5, 561
See application file for complete search history.

(56) References Cited

U.S. PATENT DOCUMENTS

| | | | | |
|---|---|---|---|---|
| 7,120,133 | B1 | 10/2006 | Joo et al. | |
| 8,971,920 | B2 | 3/2015 | Yongjin et al. | |
| 9,237,418 | B2* | 1/2016 | Liu | H04W 4/02 |
| 9,432,853 | B2* | 8/2016 | Cho | G01S 5/04 |
| 2001/0005677 | A1* | 6/2001 | Dempo | H04W 36/0055 |
| | | | | 455/436 |
| 2003/0221010 | A1* | 11/2003 | Yoneya | G06F 17/30265 |
| | | | | 709/227 |
| 2004/0203801 | A1* | 10/2004 | Chitrapu | H04L 12/6402 |
| | | | | 455/445 |
| 2005/0090201 | A1* | 4/2005 | Lengies | H04B 7/18506 |
| | | | | 455/41.2 |
| 2005/0170852 | A1* | 8/2005 | Li | H04W 4/02 |
| | | | | 455/456.5 |
| 2006/0129607 | A1* | 6/2006 | Sairo | G01S 5/02 |
| 2007/0249352 | A1* | 10/2007 | Song | H04L 63/08 |
| | | | | 455/436 |
| 2008/0139249 | A1* | 6/2008 | Kim | H04W 16/16 |
| | | | | 455/561 |
| 2008/0205399 | A1 | 8/2008 | Delesalle et al. | |
| 2008/0267114 | A1* | 10/2008 | Mukherjee | H04L 63/107 |
| | | | | 370/315 |
| 2009/0312034 | A1 | 12/2009 | Burroughs et al. | |
| 2010/0041418 | A1 | 2/2010 | Edge et al. | |
| 2010/0309044 | A1* | 12/2010 | Ische | G01S 19/46 |
| | | | | 342/357.28 |
| 2012/0015666 | A1 | 1/2012 | Horn et al. | |
| 2013/0188508 | A1* | 7/2013 | Cho | G01S 5/04 |
| | | | | 370/252 |
| 2013/0188831 | A1* | 7/2013 | Kameyama | G06K 9/00664 |
| | | | | 382/103 |
| 2014/0073347 | A1 | 3/2014 | Yongjin et al. | |
| 2015/0031389 | A1* | 1/2015 | Liu | H04W 4/02 |
| | | | | 455/456.1 |
| 2015/0141049 | A1 | 5/2015 | Jiang et al. | |
| 2016/0119758 | A1* | 4/2016 | Liu | H04W 4/02 |
| | | | | 455/456.5 |

FOREIGN PATENT DOCUMENTS

| | | | |
|---|---|---|---|
| WO | 2009120127 | A1 | 10/2009 |
| WO | 2010022010 | A1 | 2/2010 |

OTHER PUBLICATIONS

3rd Generation Partnership Project, Technical Specification Group Radio Access Network, Evolved Universal Terrestrial Radio Access Network (E-UTRAN), Stage 2 functional specification of User Equipment (UE) positioning in E-UTRAN (Release 9), 3GPP Standard, 3GPP TS 36.305, 3rd Generation Partnership Project (3GPP), Mobile Competence Centre, 650, Route Des Lucioles, F-06921 Sophia-Antipolis Cedex, France, No. V9.1.0, Dec. 28, 2009 (Dec. 28, 2009), pp. 1-52, XP050401613, [retrieved on Dec. 28, 2009].
Alcatel-Lucent et al., "LPPa Transfer through the MME", 3GPP Draft; C1-095149, 3rd Generation Partnership Project (3GPP), Mobile Competence Centre ; 650, Route Des Lucioles ; F-06921 Sophia-Antipolis Cedex ; France, no. Beijing; Nov. 9, 2009, Nov. 9, 2009 (Nov. 9, 2009), XP050384015, [retrieved on Nov. 15, 2009].
Andrew Corporation: "E-SMLC update on intra-MME handover", 3GPP Draft; S2-096746-E-SMLC-Update on Intra-MME Hando Ver, 3rd Generation Partnership Project (3GPP), Mobile Competence Centre ; 650, Route Des Lucioles ; F-06921 Sophia-Antipolis Cedex ; France, no. Cabo; Nov. 16, 2009, Nov. 16, 2009 (Nov. 16, 2009), XP050397651, [retrieved on Nov. 10, 2009].
Ericsson et al., "Change ENodeB Id to Cell Id", 3GPP Draft; S2-096938 REL9 CR23271 Cell ID, 3rd Generation Partnership Project (3GPP), Mobile Competence Centre ; 650, Route Des Lucioles ; F-06921 Sophia-Antipolis Cedex ; France, no. Cabo; Nov. 16, 2009, Nov. 16, 2009 (Nov. 16, 2009), XP050397822, [retrieved on Nov. 10, 2009].
Ericsson: "LTE positioning protocol architecture", 3GPP Draft, R3-091165, 3rd Generation Partnership Project (3GPP), Mobile Competence Centre, 650, Route Des Lucioles, F-06921 Sophia-Antipolis Cedex, France, no. San Francisco, USA, Apr. 29, 2009, Apr. 29, 2009 (Apr. 29, 2009), XP050341534, [retrieved on Apr. 29, 2009].
Ericsson: "Text Proposal for LPPa E-CID procedures", 3GPP Draft; R3-093098, 3rd Generation Partnership Project (3GPP), Mobile Competence Centre ; 650, Route Des Lucioles ; F-06921 Sophia-Antipolis Cedex ; France, no. Jeju; Nov. 9, 2009, Nov. 9, 2009 (Nov. 9, 2009), XP050392559, [retrieved on Nov. 19, 2009].
International Search Report and Written Opinion—PCT/US2011/020598, ISA/EPO—Jul. 1, 2011.
Motorola: "Addressing options for macro-to-HeNB handover with a gateway", 3GPP Draft; R3-082748, 3rd Generation Partnership Project (3GPP), Mobile Competence Centre ; 650, Route Des Lucioles ; F-06921 Sophia-Antipolis Cedex ; France, no. Prague, Czech Republic; Sep. 24, 2008, Sep. 24, 2008 (Sep. 24, 2008), XP050324016, [retrieved on Sep. 24, 2008].
Nakamura T, "LTE Rel-9 and LTE-Advanced in 3GPP", NTT Docomo,LTE Asia 2009, Sep. 8, 2009, pp. 1-28.
Qualcomm Incorporated: "Positioning support with HeNBs", 3GPP Draft; R3-100342, 3rd Generation Partnership Project (3GPP), Mobile Competence Centre ; 650, Route Des Lucioles ; F-06921 Sophia-Antipolis Cedex ; France, vol. RAN WG3, no. Valencia, Spain; Jan. 18, 2010, Jan. 15, 2010 (Jan. 15, 2010), XP050424185, [retrieved on Jan. 15, 2010].
Taiwan Search Report—TW100100853—TIPO—Oct. 17, 2013.

\* cited by examiner

METHOD AND BASE STATION FOR ROUTING MESSAGES OF A POSITIONING PROTOCOL IN A WIRELESS NETWORK

CLAIM OF PRIORITY UNDER 35 U.S.C. §119

This application is a Divisional of U.S. application Ser. No. 12/985,551, filed Jan. 6, 2011, and entitled "Method and apparatus for routing messages of a positioning protocol in a wireless network," which claims the benefit of U.S. Provisional Application No. 61/293,534, filed Jan. 8, 2010, entitled "Tracking-area-based routing of positioning messages," both of which are assigned to the assignee hereof and expressly incorporated herein by reference.

BACKGROUND

Field

The following description relates generally to wireless network communications, and more particularly to routing messages of a positioning protocol across network nodes.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In addition, devices can determine positioning at least in part by utilizing assisted global positioning system (GPS), observed time difference of arrival (OTDOA) or other triangulation techniques involving one or more base stations, enhanced cell identifier (E-CID), and/or the like. For example, a positioning server, such as a serving mobile location center (SMLC), evolved SMLC (eSMLC), etc., can provide positioning messages over an LTE positioning protocol (LPP), LPP annex (LPPa), etc. to the device and/or to other nodes in the network to facilitate performing such measurements for computing a position of the device. In one example, the positioning messages can include assistance information, such as a location of one or more base stations. In this regard, positioning messages can be requested by a device, and the request routed through at least a base station and a mobility management entity (MME) to the positioning server. Thus, the positioning server can route corresponding positioning messages to the device through the mobility management entity (MME) and related base station, based at least in part on the request.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating utilizing a mapping of a network area identifier to a base station identifier at a positioning server for routing messages of a positioning protocol. In this regard, the positioning server can appropriately route messages to a base station that are not associated with a particular device through an intermediate network node, such as a mobility management entity (MME). In another example, the positioning server can include the network area identifier in a message to allow the intermediate network node to identify a possible gateway node between the intermediate network node and the base station, and accordingly route the messages to the gateway node for providing to the base station. It is to be appreciated that the positioning server can include the network area identifier in the message regardless of whether the message is associated with a particular device or not. In addition, in this example, the intermediate network node can include an identifier of the base station in the messages to the gateway node.

According to an example, a method of communicating a message of a positioning protocol in a wireless network is provided that includes generating a message of a positioning protocol associated with a base station and determining a network area identifier associated with the base station. The method further includes delivering the message to an intermediate network node based at least in part on the network area identifier.

In another aspect, an apparatus for routing messages of a positioning protocol in a wireless network is provided that includes at least one processor configured to generate a message of a positioning protocol associated with a base station and determine a network area identifier associated with the base station. The at least one processor is further configured to provide the message to an intermediate network node based at least in part on the network area identifier. In addition, the apparatus includes a memory coupled to the at least one processor.

In yet another aspect, an apparatus for routing messages of a positioning protocol in a wireless network is provided that includes means for generating a message of a positioning protocol associated with a base station and means for determining a network area identifier associated with the base station. The apparatus further includes means for delivering the message to an intermediate network node based at least in part on the network area identifier.

Still, in another aspect, a computer-program product is provided routing messages of a positioning protocol in a wireless network including a computer-readable medium having code for causing at least one computer to generate a message of a positioning protocol associated with a base station and code for causing the at least one computer to determine a network area identifier associated with the base station. The computer-readable medium further includes code for causing the at least one computer to provide the message to an intermediate network node based at least in part on the network area identifier.

Moreover, in an aspect, an apparatus for routing messages of a positioning protocol in a wireless network is provided that includes a message component for generating a message of a positioning protocol associated with a base station and a network area identifier determining component for discerning a network area identifier associated with the base station. The apparatus further includes a message routing component for delivering the message to an intermediate network node based at least in part on the network area identifier.

According to another example, a method for routing messages of a positioning protocol in a wireless network is provided that includes receiving a network area identifier related to a base station in a message of a positioning protocol and determining whether a gateway is present based at least in part on the network area identifier. The method further includes delivering the message to a network node based at least in part on whether the gateway is present.

In another aspect, an apparatus for routing messages of a positioning protocol in a wireless network is provided that includes at least one processor configured to receive a network area identifier related to a base station in a message of a positioning protocol and determine whether a gateway is present based at least in part on the network area identifier. The at least one processor is further configured to provide the message to a network node based at least in part on whether the gateway is present. In addition, the apparatus includes a memory coupled to the at least one processor.

In yet another aspect, an apparatus for routing messages of a positioning protocol in a wireless network is provided that includes means for receiving a network area identifier related to a base station in a message of a positioning protocol and means for determining whether a gateway is present based at least in part on the network area identifier. The apparatus further includes means for delivering the message to a network node based at least in part on whether the gateway is present.

Still, in another aspect, a computer-program product is provided for routing messages of a positioning protocol in a wireless network including a computer-readable medium having code for causing at least one computer to receive a network area identifier related to a base station in a message of a positioning protocol and code for causing the at least one computer to determine whether a gateway is present based at least in part on the network area identifier. The computer-readable medium further includes code for causing the at least one computer to provide the message to a network node based at least in part on whether the gateway is present.

Moreover, in an aspect, an apparatus for routing messages of a positioning protocol in a wireless network is provided that includes a message receiving component for obtaining a network area identifier related to a base station in a message of a positioning protocol and a gateway presence determining component for discerning whether a gateway is present based at least in part on the network area identifier. The apparatus further includes a message routing component for delivering the message to a network node based at least in part on whether the gateway is present.

In another example, a method for updating positioning information in a wireless network is provided that includes receiving one or more messages from a positioning server and detecting modification of one or more parameters related to a position. The method further includes communicating a message to the positioning server including the one or more parameters as modified.

In another aspect, an apparatus for updating positioning information in a wireless network is provided that includes at least one processor configured to receive one or more messages from a positioning server and detect modification of one or more parameters related to a position. The at least one processor is further configured to communicate a message to the positioning server including the one or more parameters as modified. In addition, the apparatus includes a memory coupled to the at least one processor.

In yet another aspect, an apparatus for updating positioning information in a wireless network is provided that includes means for detecting modification of one or more parameters related to a position. The apparatus further includes means for communicating a message to a positioning server including the one or more parameters as modified.

Still, in another aspect, a computer-program product is provided for updating positioning information in a wireless network including a computer-readable medium having code for causing at least one computer to receive one or more messages from a positioning server and code for causing the at least one computer to detect modification of one or more parameters related to a position. The computer-readable medium further includes code for causing the at least one computer to communicate a message to the positioning server including the one or more parameters as modified.

Moreover, in an aspect, an apparatus for updating positioning information in a wireless network is provided that includes a configuration modification detecting component for determining modification of one or more parameters related to a position. The apparatus further includes a positioning server communicating component for transmitting a message to a positioning server including the one or more parameters as modified.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
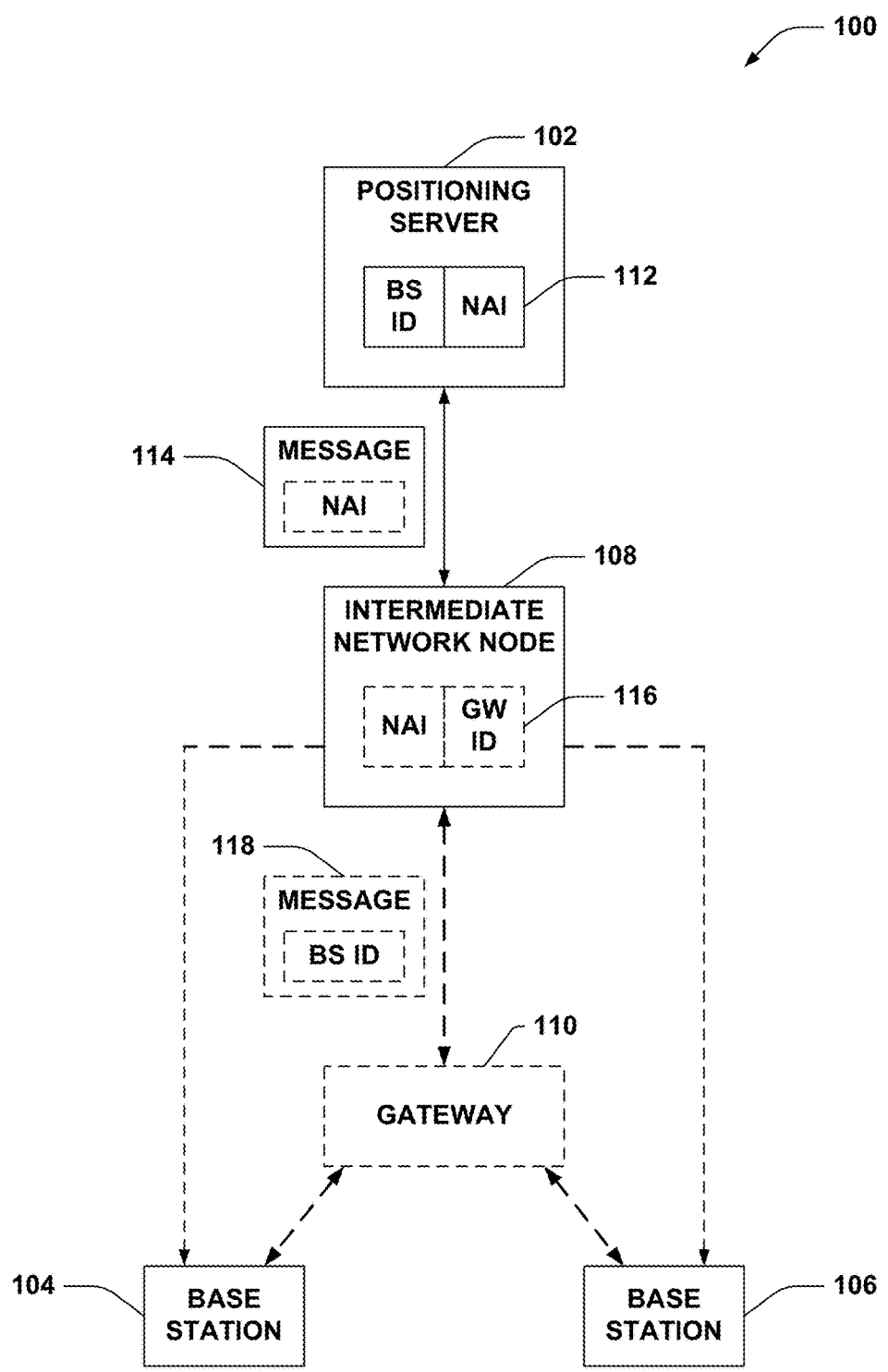
FIG. 1 illustrates an example system for communicating messages of a positioning protocol across various network nodes.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a mapping of network area identifiers to base station identifiers can be utilized by a positioning server to determine an intermediate network node related to a base station for routing one or more messages of a positioning protocol. In addition, for example, the network area identifier can be indicated in the messages where one or more gateway nodes exist between the intermediate network node and the base station. Thus, the intermediate network node can determine an appropriate gateway node to which to forward the message based at least in part on the network area identifier. Moreover, in this example, the intermediate network node can include an identifier of the base station in the message to allow the gateway node to determine the base station to which to forward the message. Furthermore, for example, a base station can be a home evolved Node B (HeNB), which can update its configuration to the positioning server upon detecting a modification to it position or other configuration parameters.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates routing messages of a positioning protocol among one or more network nodes. System 100 includes a positioning server 102 that provides messages of a positioning protocol to one or more base stations 104 and/or 106 (which can relate to devices served by base stations 104 and 106, or otherwise). In addition, system 100 includes an intermediate network node 108 that can, in one example, route the messages to base stations 104 and/or 106. System 100 can also optionally include a gateway 110 that further routes messages from intermediate network node 108 to the base stations 104 and/or 106, in another example. Positioning server 102 can be a serving mobile location center (SMLC), evolved SMLC (eSMLC) in LTE, and/or the like. Base stations 104 and 106 can be a macrocell base station, femtocell or picocell base station (e.g., home evolved Node B (HeNB)), a mobile base station, relay node, a portion thereof, and/or the like. Intermediate network node 108 can be a mobility management entity (MME) that provides authorization and/or authentication for one or more devices communicating with base stations 104 and/or 106, and/or a similar network node. Where base stations 104 and 106 are HeNBs, optional gateway 110 can be a HeNB gateway, for example.

According to an example, positioning server 102 can communicate messages of the positioning protocol to base stations 104 and/or 106 at least through intermediate network node 108. In one example, the positioning protocol can be an LTE positioning protocol (LPP), LPP annex (LPPa), and/or similar positioning protocol. In addition, for example, the messages can relate to specific requests from devices communicating with base stations 104 and/or 106, and can be received through intermediate network node 108. Thus, the messages can include a related network area identifier, such as a tracking area identifier (TAI) in LTE, as specified by the intermediate network node 108. Thus, for a given response message, positioning server 102 can identify an intermediate network node based at least in part on a network area identifier that positioning server 102 can associate with the response message.

In addition, in an example, positioning server 102 stores a mapping of network area identifiers (NAI) to base station identifiers (BS ID), such as mapping 112. For example, the mapping can be of a format similar to the following:

| Base Station ID | Network Area Identifier |
|---|---|
| Xxx | Yyy |
| Zzz | Yyy |
| Ppp | Ttt |
| ... | ... | where Xxx, Zzz, and Ppp represent base station identifiers, and Yyy and Ttt represent corresponding network area identifiers. It is to be appreciated that the identifiers can be substantially any value of substantially any format (e.g., a string, integer, etc.). In this regard, for example, positioning server 102 can receive or otherwise generate one or more messages of the positioning protocol intended for a base stations 104 and/or 106, such as message 114, which can thus be associated with an identifier of the base stations 104 and/or 106 (e.g., where the messages are not associated with a request from a device). Based at least in part on the identifier of base station 104 and/or 106, for example, positioning server 102 can determine a network area identifier associated with messages according to the mapping, and can transmit the messages to intermediate network node 108 based at least in part on the network area identifier. Where gateway 110 is not present, for example, intermediate network node 108 can forward the messages to base stations 104 and/or 106 based at least in part on a base station identifier within the messages.

Moreover, where gateway 110 is present positioning server 102 can optionally include the network area identifier in the messages to the intermediate network node 108 even for messages associated with a particular device, as shown for message 114. In this example, the intermediate network node 108 can similarly store a mapping of network area identifiers to gateway identifiers (GW ID), such as mapping 116. Similarly, this mapping can have a format similar to the following, in one example:

| Network Area Identifier | Gateway ID |
|---|---|
| Yyy | Qqq |
| Ttt | Fff |
| ... | ... | where Yyy and Ttt represent network area identifiers, and Qqq and Fff represent corresponding gateway identifiers. It is to be appreciated that the identifiers can be substantially any value of substantially any format (e.g., a string, integer, etc.). Accordingly, intermediate network node 108 can determine one or more gateways, such as gateway 110, associated with the network area identifier, and can forward the messages to gateway 110 along with the base station identifier, such as message 118. Gateway 110, in this example, can receive the messages of the positioning protocol and can forward the messages to base stations 104 and/or 106 based at least in part on the base station identifier in the messages.

In this regard, for positioning messages that are not related to specific devices but are intended for a particular base station 104 and/or 106, such as messages related to a position of a base station, base station timing, acknowledging a position update from the base station, and/or the like, as described herein, the positioning server 102 can identify the intermediate network node 108 to which base station 104 and/or 106 communicates based on the mapping and the base station identifier in the message, since it does not have a specific device identifier the corresponds to the intermediate network node 108. In addition, where gateway 110 is present, positioning server 102 can include the network area identifier in the message, and the intermediate network node 108 can determine the gateway 110 associated therewith to determine the gateway 110 corresponding to base station 104 and/or 106. This can be performed regardless of whether the positioning message relates to a particular device, in this example, since the intermediate network node 108 may not otherwise know to which gateway 110 the base station 104 and/or 106 communicates.

Figure 2:
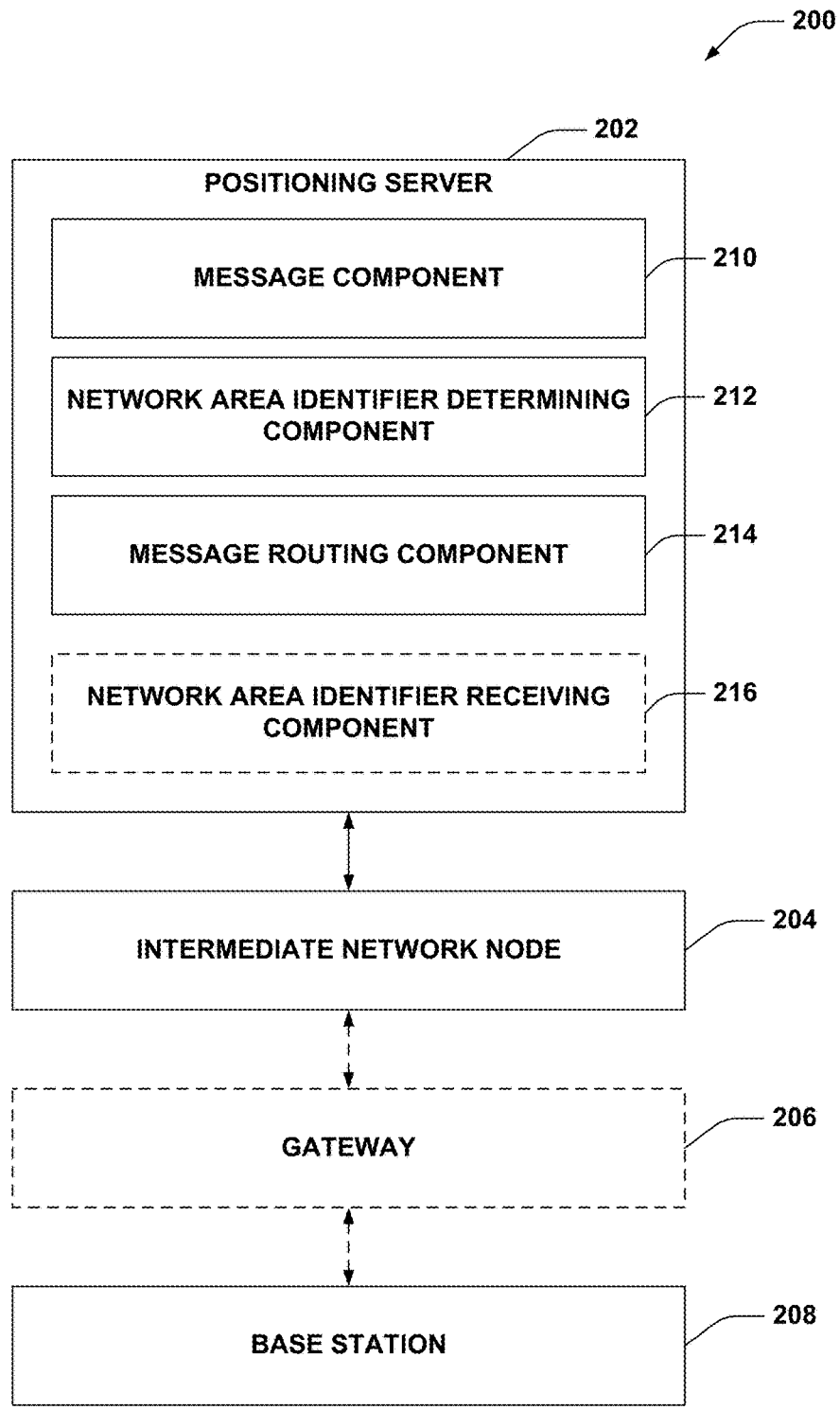
FIG. 2 illustrates an example system for communicating messages at least from a positioning server to an intermediate network node.

Turning to FIG. 2, an example wireless communication system 200 is illustrated that facilitates routing messages of a positioning protocol based at least in part on a network area identifier. System 200 can include a positioning server 202, which can be similar to substantially any positioning server described herein, and can thus be an eSMLC, etc. System 200 can also include an intermediate network node 204 that can be similar to substantially any intermediate network node described herein, and can thus be an MME or similar component that facilitates communicating with one or more devices or related base stations. Moreover, for example, system 200 can optionally comprise a gateway 206 that facilitates accessing one or more base stations, such as base station 208. Where gateway 206 is not present, for example, intermediate network node 204 can communicate directly with base station 208. As described, base station 208 can be an HeNB, macrocell base station, mobile base station, relay node, etc., as described. Thus, for example, where base station 208 is an HeNB, gateway 206 can be an HeNB gateway.

Positioning server 202 can comprise a message component 210 that obtains or generates one or more messages of a positioning protocol (e.g., LPPa, etc.) intended for one or more base stations or related device communication with the one or more base stations, and a network area identifier determining component 212 for discerning a network area identifier associated with an identifier of the one or more base stations. Positioning server 202 can also include a message routing component 214 for delivering the one or more messages to an intermediate network node for providing to the one or more base stations based at least in part on the network area identifier, and an optional network area identifier receiving component 216 for obtaining one or more network area identifiers (e.g., and/or associations to one or more base station identifiers).

According to an example, message component 210 can receive or otherwise generate a message of a positioning protocol for transmitting to a base station, such as base station 208. In one example, the message can be directed to a device based at least in part on a request from the device. In another example, the message can be directed to the base station and can be a message related to positioning of the base station 208, timing, an acknowledgement of a positioning update, as described further herein, etc., for example. In either case, the message can include an identifier of the base station, and network area identifier determining component 212 can determine the identifier of the base station along with a network area identifier associated with the identifier of the base station. In one example, network area identifier determining component 212 determines such based at least in part on a mapping of network area identifiers to base station identifiers stored by network area identifier determining component 212 (e.g., in a memory or other data store, etc.). In one example, the network area identifier can be a tracking area identifier (TAI) or similar identifier. In addition, intermediate network node 204 can be an MME associated with the TAI in a core network that includes the positioning server 202, intermediate network node 204, etc.

In this regard, message routing component 214 can determine intermediate network node 204 as associated with the determined network area identifier, and can forward the message to intermediate network node 204 for providing to base station 208.

Moreover, for example, network area identifier receiving component 216 can obtain the mapping of network area identifier to base station identifiers from one or more components of the core network (not shown), such as an operations and management (OAM) or similar component. For example, the mapping provided can be a static or semistatic database, such that one or more components can update the mappings. In one example, base station 208 can provision updates to the mapping related to base station 208 based at least in part on detecting a configuration change, as described further herein, according to a timer, and/or the like. In another example, intermediate network node 204 can provide mappings to positioning server 202 based at least in part on the network area identifier associated with intermediate network node 204 and an identifier of one or more base stations communicating with intermediate network node 204 (e.g., this can occur periodically, for a given base station during initialization, based on another event, and/or the like). In addition, in one example, base station 208 can provide its identifier to the positioning server 202 to propagate updates at base station 208, as described above, as part of intermediate network node 204 provisioning network area identifier mappings, and/or the like.

In another example, where gateway 206 is present, message routing component 214 can include the determined network area identifier within the message. In this regard, as described further herein, intermediate network node 204 can determine to route the message to a gateway related to the network area identifier for communicating to the base station 208. In addition, as described further herein, intermediate network node 204 can specify to positioning server 202 whether or not to include the network area identifier in the message. In one example, intermediate network node 204 can communicate a parameter to positioning server 202 to request a network area identifier in all messages to the intermediate network node 204, only for a specified set of base station identifiers (e.g., only HeNBs), and/or the like. In either case, network area identifier receiving component 216 can obtain the indication and/or set of base station identifiers, and message routing component 214 can accordingly indicate the network area identifier as desired in corresponding messages. In another example, positioning server 202 can include the network area identifier in messages by default unless otherwise instructed by the intermediate network node 204.

Figure 3:
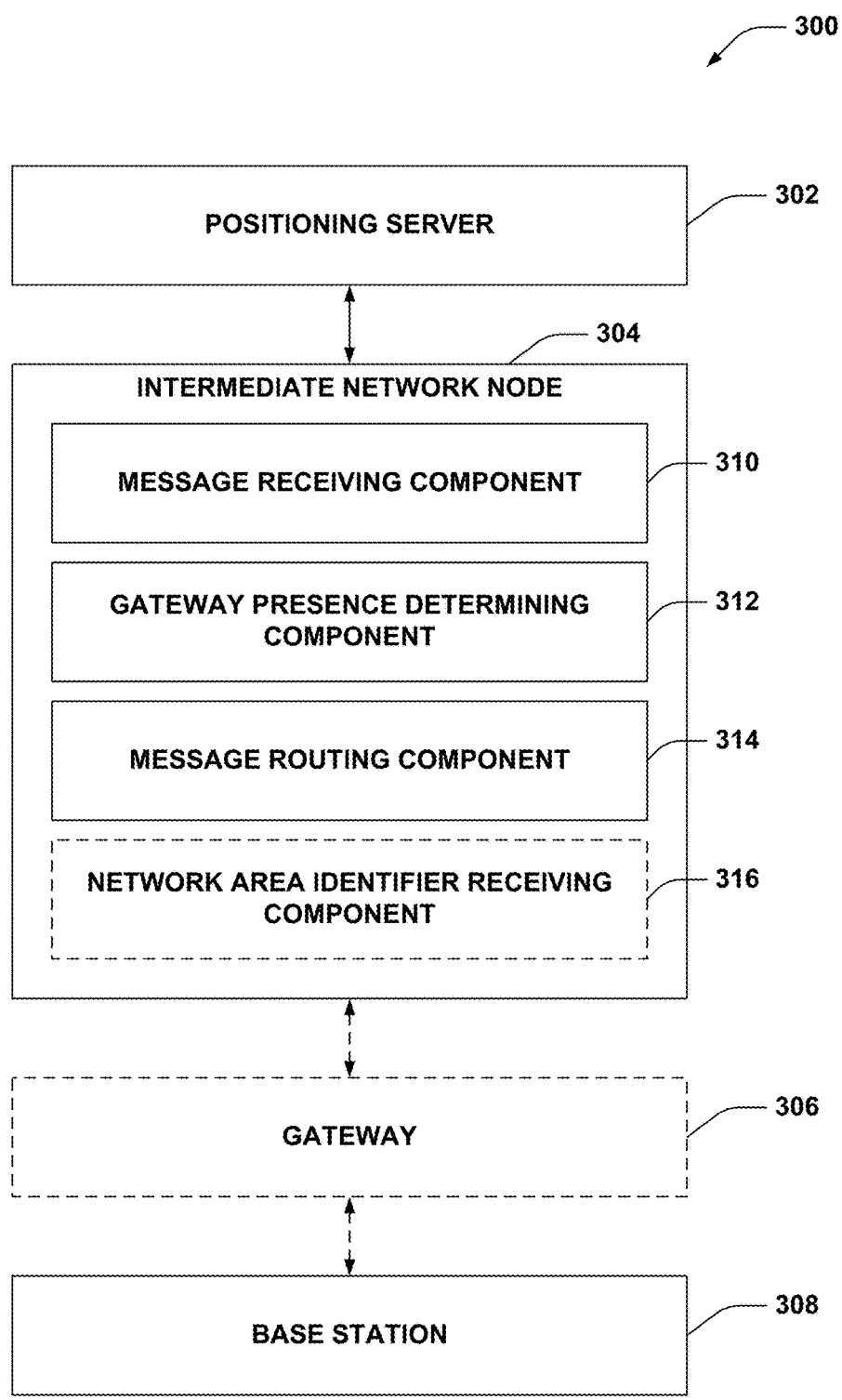
FIG. 3 illustrates an example system for communicating messages at least from an intermediate network node to a gateway or base station.

Referring to FIG. 3, illustrated is an example wireless communication system 300 that facilitates routing messages of a positioning protocol based at least in part on a network area identifier. System 300 can include a positioning server 302, which can be similar to substantially any positioning server described herein, and can thus be an eSMLC, etc., as described. System 300 can also include an intermediate network node 304 that can be similar to substantially any intermediate network node described herein, and can thus be an MME or similar component that facilitates communicating with one or more devices or related base stations. Moreover, for example, system 300 can optionally comprise a gateway 306 that facilitates accessing one or more base stations, such as base station 308, as described. Where gateway 306 is not present, for example, intermediate network node 304 can communicate directly with base station 308. As described, base station 308 can be an HeNB, macrocell base station, mobile base station, relay node, etc., as described. Thus, for example, where base station 308 is an HeNB, gateway 306 can be an HeNB gateway.

Intermediate network node 304 can comprise a message receiving component 310 that obtains a message of a positioning protocol (e.g., LPPa, etc.) related to one or more base stations from a positioning server, and a gateway presence determining component 312 that can detect whether a gateway exists between intermediate network node 304 and the one or more base stations (e.g., and/or one or more devices communicating therewith). Intermediate network node 304 can additionally comprise a message routing component 314 that forwards the message to a gateway where present, or the one or more base stations, and an optional network area identifier receiving component 316 that obtains network area identifiers and associated gateway identifiers.

According to an example, message receiving component 310 can obtain a message of the positioning protocol from positioning server 302 related to one or more base stations, such as base station 308 or a device communicating therewith. Gateway presence determining component 312, in one example, discerns whether a gateway exists between intermediate network node 304 and base station 308. In one example, this can include determining whether base station 308 is a HeNB, detecting the gateway 306 upon initialization of base station 308 with a core network, receiving an indication of gateway 306 from base station 308 or one or more other network components or devices, and/or the like. In one example, gateway presence determining component 312 can store a list of base station identifiers that correspond to base stations that communicate through a gateway. Moreover, for example, gateway presence determining component 312 can forward such identifiers to positioning server 302, so positioning server can determine whether to provide a network area identifier in communications for the base stations, as described previously.

Additionally, in this regard, where a network area identifier is received in the message from positioning server 302, gateway presence determining component 312 specifies that a gateway exists between intermediate network node 304 and base station 308. In this example, message routing component 314 can determine the gateway, which is gateway 306, based at least in part on a stored mapping between the network area identifier and an identifier of gateway 306. As described, for example, network area identifier receiving component 316 can obtain this mapping (e.g., from an OAM), generate the mapping based at least in part on associating gateway identifiers with network area identifiers upon initialization of the gateway 306 or base station 308 with the core network, and/or the like.

Moreover, for example, message routing component 314 can include the identifier of the base station in the message or a header thereof to facilitate routing at the gateway 306. In another example, where the message received from the positioning server 302 does not include a network area identifier, gateway presence determining component 312 can determine that there is no gateway between intermediate network node 304 and base station 308, and message routing component 314 can forward the message directly to base station 308.

Figure 4:
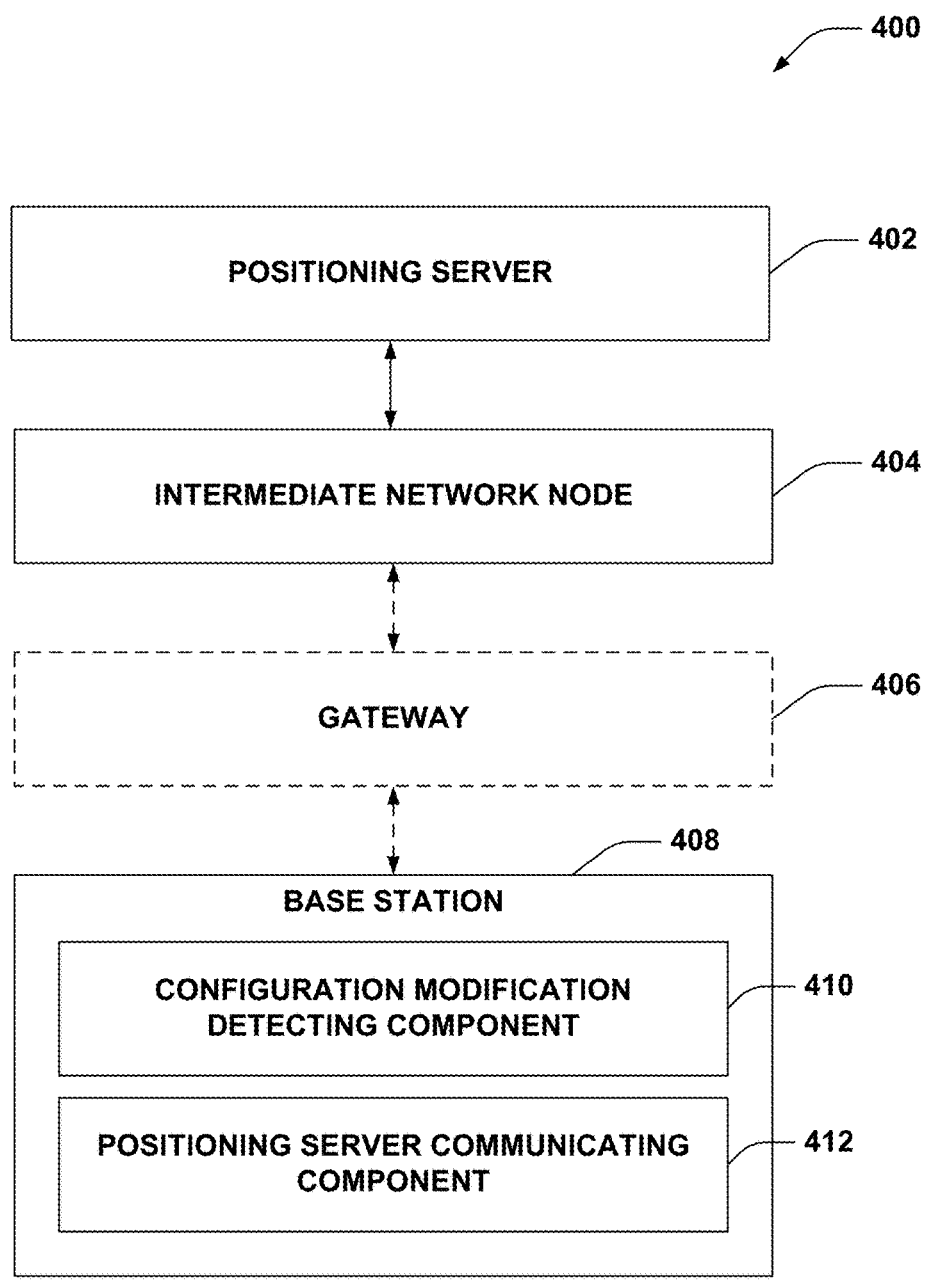
FIG. 4 illustrates an example system that facilitates updating positioning information with a positioning server.

Turning to FIG. 4, an example wireless communication system 400 that facilitates routing messages of a positioning protocol based at least in part on a network area identifier is illustrated. System 400 can include a positioning server 402, which can be similar to substantially any positioning server described herein, and can thus be an eSMLC, etc., as described. System 400 can also include an intermediate network node 404 that can be similar to substantially any intermediate network node described herein, and can thus be an MME or similar component that facilitates communicating with one or more devices or related base stations, as described. Moreover, as described for example, system 400 can optionally comprise a gateway 406 that facilitates accessing one or more base stations, such as base station 408, as described. Where gateway 406 is not present, for example, intermediate network node 404 can communicate directly with base station 408. As described, base station 408 can be an HeNB, macrocell base station, mobile base station, relay node, etc., as described. Thus, for example, where base station 408 is an HeNB, gateway 406 can be an HeNB gateway.

Base station 408 can comprise a configuration modification detecting component 410 that can determine modification of one or more configuration parameters for a base station, and a positioning server communicating component 412 that can communicate the one or more configuration parameters as modified to one or more network components. According to an example, as described, positioning server 402 can communicate messages of a positioning protocol (e.g., LPPa, etc.) to base station 408 through intermediate network node 404 and/or gateway 406 (if present), which can be received at positioning server communicating component 412. As described, base station 408 can be an HeNB, which can be configured by a user. Similarly, for example, the base station 408 can be moved from one location to another. In either case, this can result in a configuration update. In an example, configuration modification detecting component 410 can determine the modification of at least one or more positioning parameters, such as location, at least in part by monitoring the parameters, or otherwise being notified of modification.

In this example, positioning server communicating component 412 can transmit a message to positioning server 402 to update the parameters for base station 408. For example, the message can be of the positioning protocol utilized by positioning server 402 to communicate with base station 408. In one example, the parameters can relate to assistance data subsequently provided to one or more devices for determining positioning. In another example, the updated position or other parameters may change the network area identifier (and/or gateway 406, in one example) associated with base station 408. Thus, the positioning server 402, in this example, can associate the identifier of base station 408 with the new network area identifier, and/or intermediate network node 404 can associate the network area identifier with the new gateway, if not already associated, for example.

Figure 5:
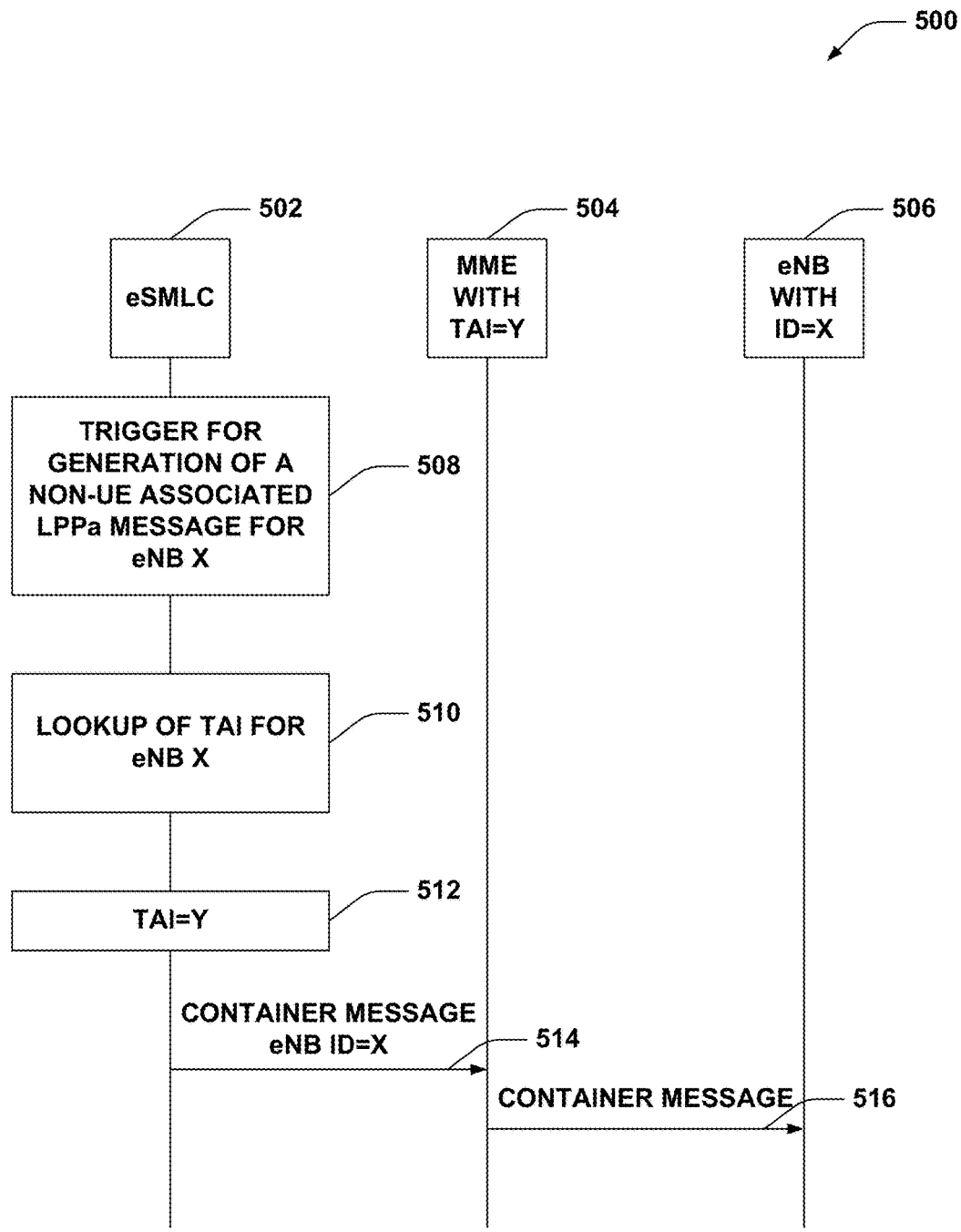
FIG. 5 illustrates an example system for communicating messages of a positioning protocol between various network nodes.

Referring to FIG. 5, an example wireless communication system 500 is illustrated that facilitates routing messages of a positioning protocol. System 500 comprises an eSMLC 502 that communicates positioning protocol message through an MME 504 to an eNB 506. In this example, MME 504 can be associated with TAI Y, and eNB 506 can have identifier X. As depicted, at eSMLC 502, generation of a non-UE associated LPPa message for eNB X can be triggered 508. This can include, for example, messages for requesting a position, updating timing, acknowledging positioning updates, and/or the like. eSMLC can lookup a TAI for eNB X 510. As described, this can include analyzing a mapping of TAIs to eNB identifiers, which can be received or otherwise generated/updated by eSMLC 502. eSMLC 502 can determine that TAI Y is associated with eNB X 512. Thus, eSMLC 502 can transmit a container message that specifies eNB ID=X 514 to MME 504, based at least in part on MME 504 being associated with TAI Y. For example, the container message 514 can be a location service (LCS) message in LTE. MME 504 can subsequently forward container message 516, which can have different headers than container message 514, to eNB 506 based at least in part on the eNB ID received in container message 514.

Figure 6:
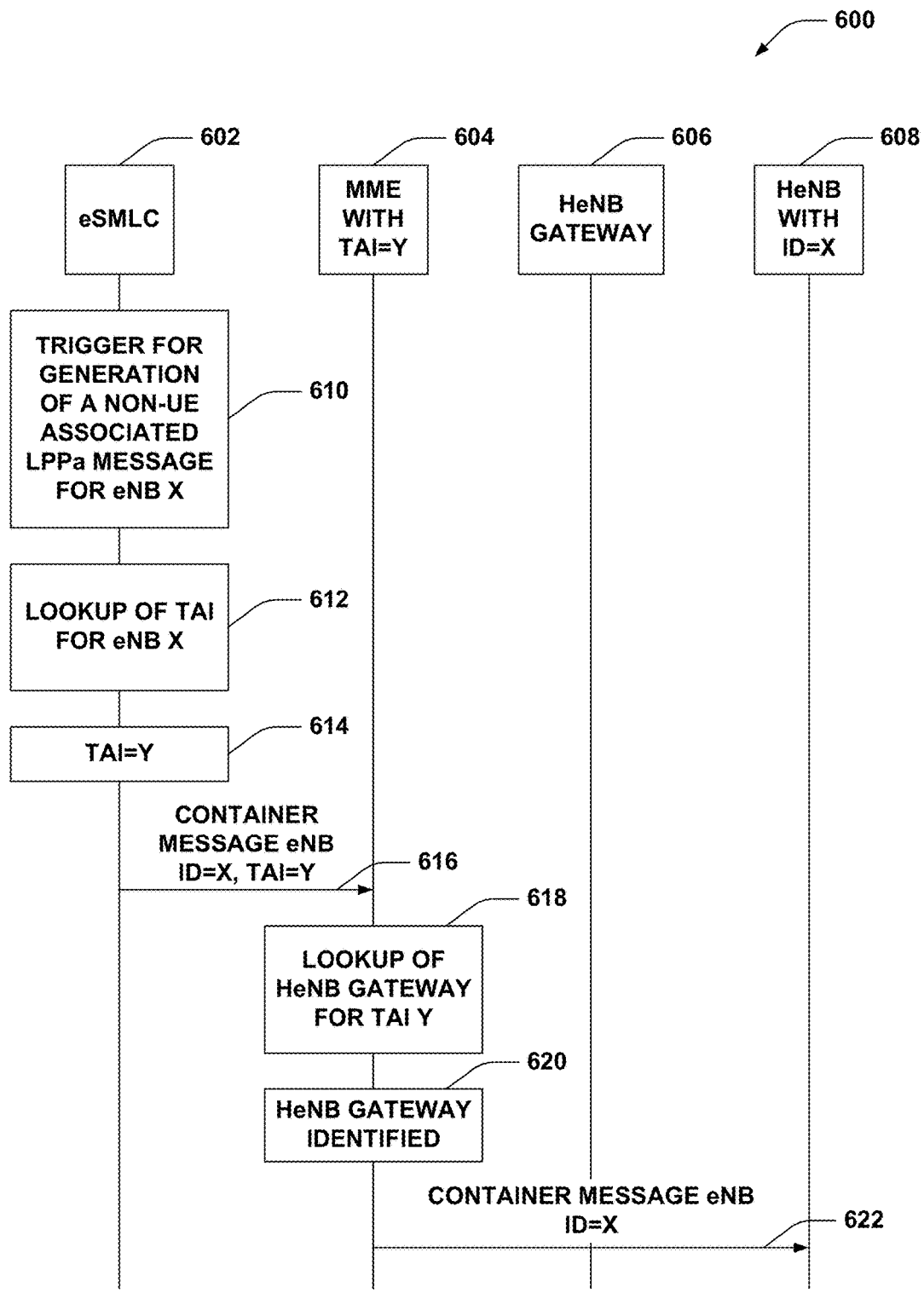
FIG. 6 illustrates an example system for communicating messages of a positioning protocol between various network nodes including at least one gateway.

Referring to FIG. 6, an example wireless communication system 600 is illustrated that facilitates routing messages of a positioning protocol. System 600 comprises an eSMLC 602 that communicates positioning protocol message through an MME 604 and a HeNB gateway 606 to an HeNB 608. In this example, MME 604 can be associated with TAI Y, and HeNB 608 can have identifier X. As depicted, at eSMLC 602, generation of a non-UE associated LPPa message for eNB X can be triggered 610. This can include, for example, messages for requesting a position, updating timing, and/or the like. eSMLC can lookup a TAI for eNB X 612. As described, this can include analyzing a mapping of TAIs to eNB identifiers, which can be received or otherwise generated/updated by eSMLC 602. eSMLC 602 can determine that TAI Y is associated with eNB X 614. Thus, eSMLC 502 can transmit a container message that specifies eNB ID=X and TAI=Y 616 to MME 604, based at least in part on MME 604 being associated with TAI Y.

As described, for example, eSMLC 602 can include TAI Y in container message 616 based at least in part on a request from MME 604 to include TAI in all container messages, container messages for eNB X, and/or the like, a determination to include TAI in container messages, eSMLC 602 or MME 604 detecting presence of HeNB gateway 606, and/or the like. MME 604 can receive the container message 616 and can lookup a HeNB gateway for TAI Y 618. MME 604 can identify the HeNB gateway 620 related to TAI Y and can transmit container message 622 to HeNB gateway 606 for forwarding to HeNB 608. For example, MME 604 can include eNB ID=X in the container message 622 (e.g., or a header thereof) to allow HeNB gateway 606 to determine the container message 622 is for HeNB 608.

Figure 7:
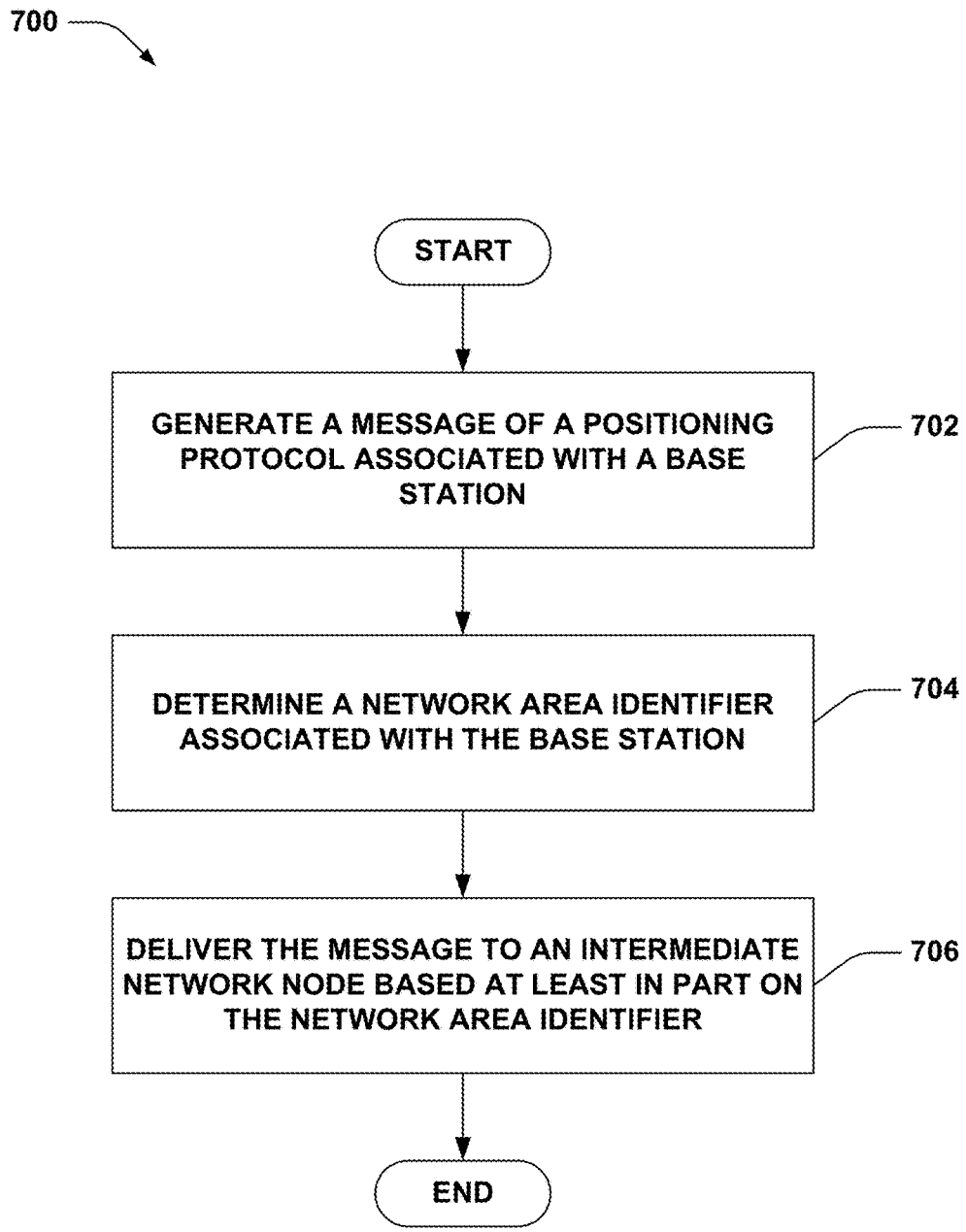
FIG. 7 illustrates an example methodology that routes messages of a positioning protocol.
Figure 8:
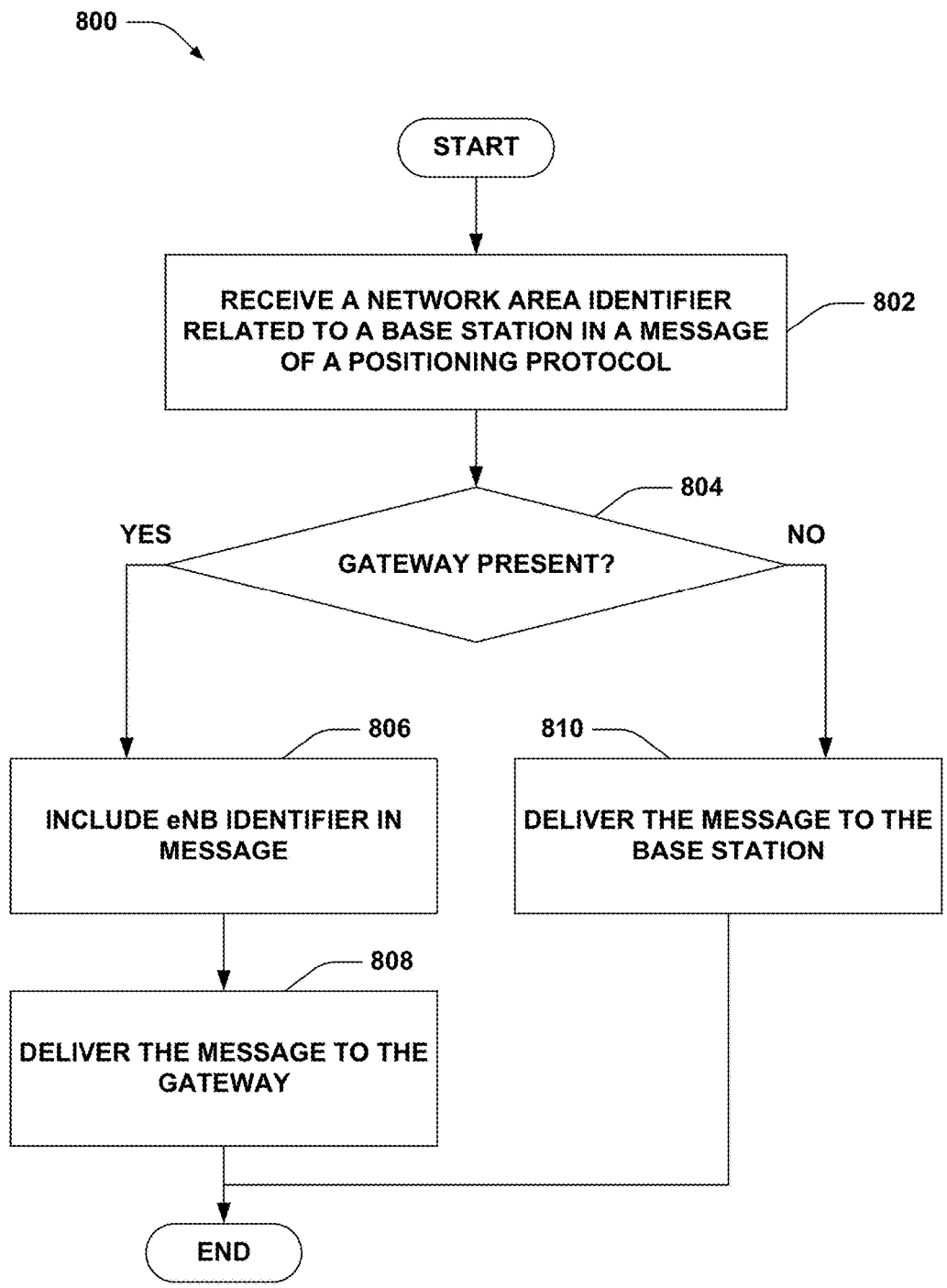
FIG. 8 illustrates an example methodology that routes received messages of a positioning protocol.
Figure 9:
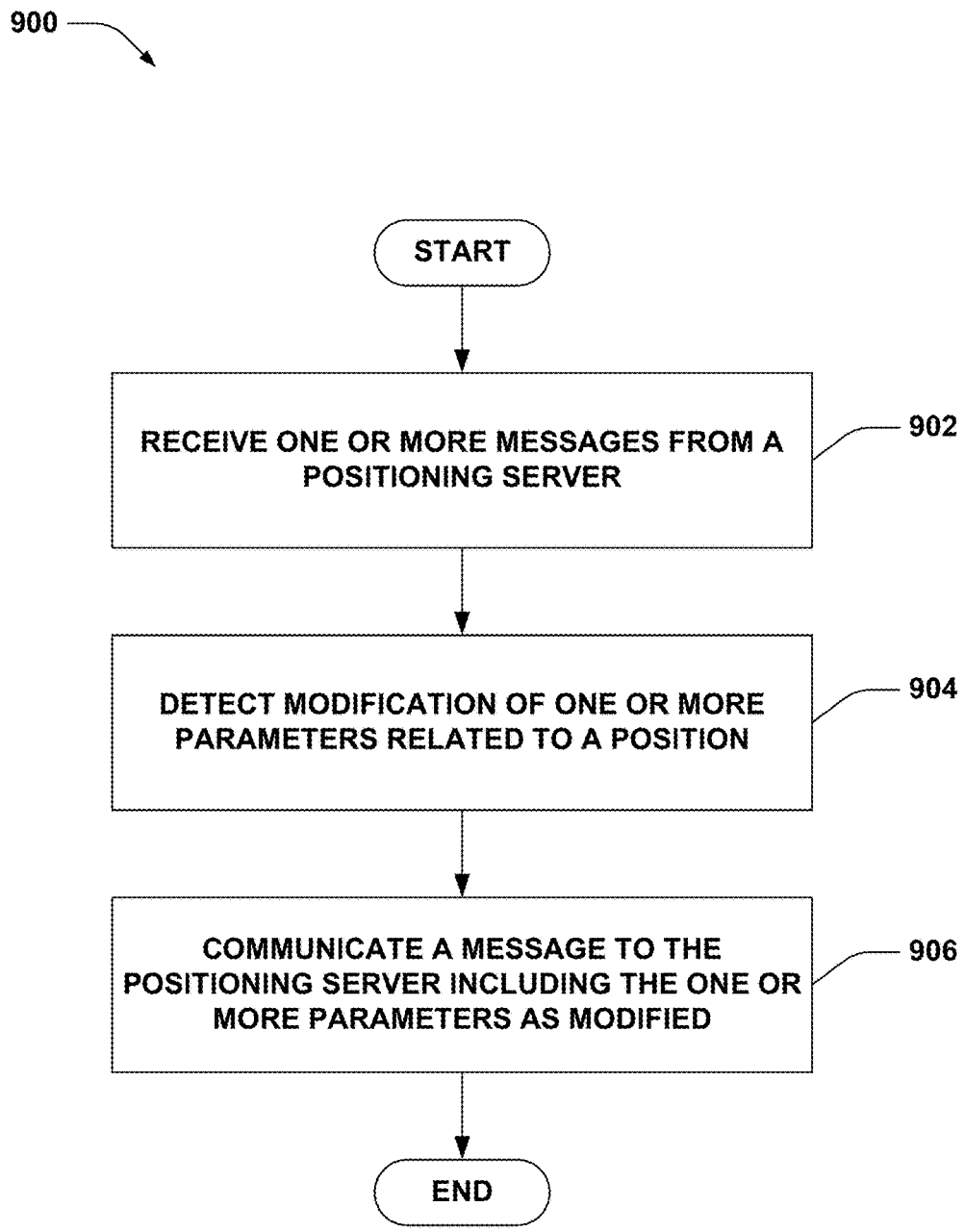
FIG. 9 illustrates an example methodology for updating positioning information.

Referring to FIGS. 7-9, example methodologies relating to routing messages of a positioning protocol are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 7, an example methodology 700 is displayed that facilitates routing messages of a positioning protocol. At 702, a message of a positioning protocol associated with a base station can be generated. For example, as described, the positioning protocol can be LPPa, etc., and the message can relate to a position, timing, acknowledgement of a positioning information update, and/or one or more similar parameters. In another example, the message can relate to a device served by the base station. At 704, a network area identifier associated with the base station can be determined. As described, for example, this can be determined based at least in part on locating the network area identifier in a mapping of network area identifiers to base station identifiers. At 706, the message can be delivered to an intermediate network node based at least in part on the network area identifier. As described, for example, the intermediate network node can be an MME, the network area identifier can be a TAI, etc.

Turning to FIG. 8, an example methodology 800 is displayed that facilitates routing messages of a positioning protocol. At 802, a network area identifier related to a base station can be received in a message of a positioning protocol. At 804, it can be determined whether a gateway is present (e.g., whether the base station is served by the gateway). For example, this can be based at least in part on analyzing a mapping of network area identifiers to gateway identifiers to determine whether the received network area identifier is associated with a gateway. If so, at 806, an eNB identifier can be included in the message, and at 808, the message can be delivered to the gateway. If the gateway is not present, at 810, the message can be delivered to the base station.

Referring to FIG. 9, illustrated is an example methodology 900 for updating positioning information. At 902, one or more messages can be received from a positioning server, as described above. At 904, modification of one or more parameters related to a position can be detected. For example, this can include detecting a change in location (e.g., based at least in part on monitored coordinates). At 906, a message including the one or more parameters as modified can be communicated to the positioning server. For example, the message can be of the positioning protocol of the one or more messages received from the positioning server, as described.

It will be appreciated that, in accordance with one or more aspects described herein, inferences can be made regarding associating network area identifiers with base station identifiers or HeNB gateway identifiers, determining an intermediate network node or HeNB gateway based at least in part upon the network area identifiers, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
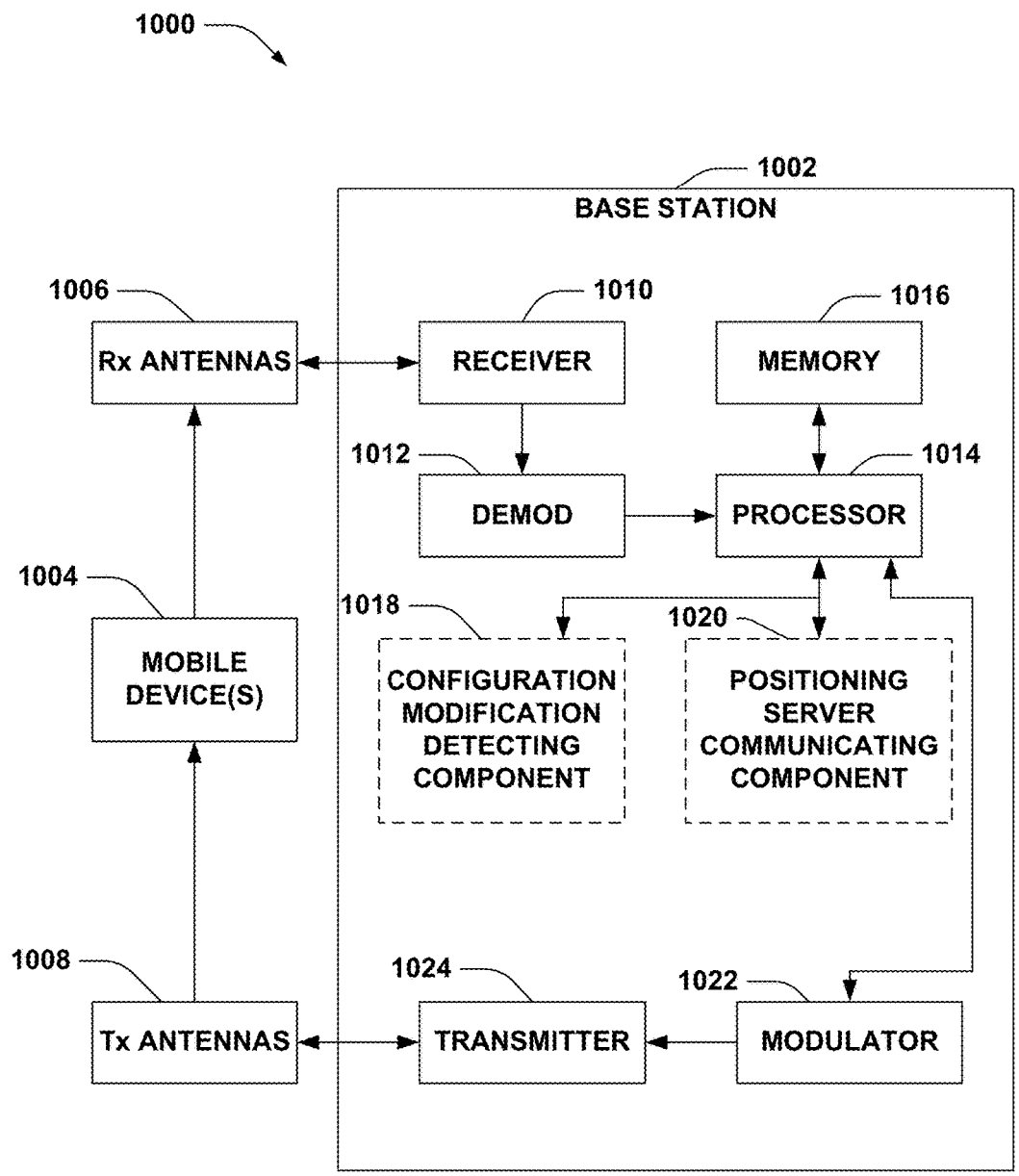
FIG. 10 illustrates an example system that updates positioning information.

FIG. 10 is an illustration of a system 1000 that facilitates updating positioning configuration. System 1000 comprises a base station 1002, which can be substantially any base station (e.g., a small base station, such as a femtocell, picocell, etc., relay node, mobile base station . . . ) having a receiver 1010 that receives signal(s) from one or more mobile devices 1004 through a plurality of receive antennas 1006 (e.g., which can be of multiple network technologies, as described), and a transmitter 1024 that transmits to the one or more mobile devices 1004 through a plurality of transmit antennas 1008 (e.g., which can be of multiple network technologies, as described). In addition, in one example, transmitter 1024 can transmit to the mobile devices 1004 over a wired front link. Receiver 1010 can receive information from one or more receive antennas 1006 and is operatively associated with a demodulator 1012 that demodulates received information. In addition, in an example, receiver 1010 can receive from a wired backhaul link. Demodulated symbols are analyzed by a processor 1014 that can be similar to processors described herein, and which is coupled to a memory 1016 that can store information related to estimating a signal (e.g., pilot) strength and/or interference strength, data to be transmitted to or received from mobile device(s) 1004 (or a disparate base station (not shown)), and/or any other suitable information related to performing the various actions and functions set forth herein.

Memory 1016 can additionally store protocols and/or algorithms associated with estimating and/or utilizing a channel (e.g., performance based, capacity based, etc.), updating positioning information, or substantially any other aspect described herein. It will be appreciated that memory 1016 can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1016 of the subject systems and methods is intended to comprise, without being limited to, these and any other suitable types of memory, and can generally be a data store, as described herein.

Processor 1014 is further optionally coupled to a configuration modification detecting component 1018, which can be similar to a configuration modification detecting component 410, and a positioning server communicating component 1020, which can be similar to a positioning server communicating component 412. In this regard, the configuration modification detecting component 1018 and positioning server communicating component 1020 can utilize processor 1014 to execute one or more functions described herein, memory 1016 to store such instructions or parameters related thereto, and/or the like.

Moreover, for example, processor 1014 can modulate signals to be transmitted using modulator 1022, and transmit modulated signals using transmitter 1024. Transmitter 1024 can transmit signals to mobile devices 1004 over Tx antennas 1008. Furthermore, although depicted as being separate from the processor 1014, it is to be appreciated that configuration modification detecting component 1018, positioning server communicating component 1020, demodulator 1012, and/or modulator 1022 can be part of the processor 1014 or multiple processors (not shown).

Figure 11:
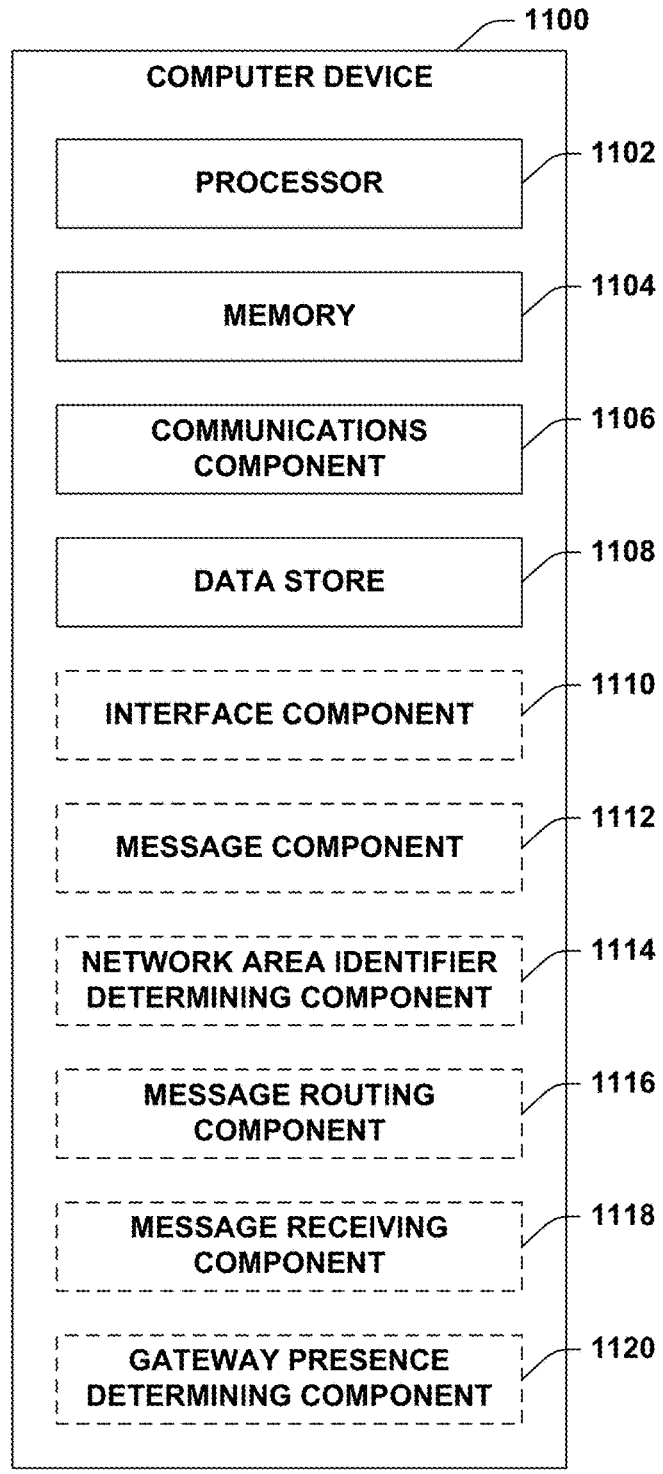
FIG. 11 illustrates an example computing device for routing messages of a positioning protocol.

Referring to FIG. 11, in one aspect, any of network nodes 102, 108, 202, 204, 302, 304, 402, 404, 502, 504, 602, or 604, etc. (e.g., FIGS. 1-6) may be represented by computer device 1100. Computer device 1100 includes a processor 1102 for carrying out processing functions associated with one or more of components and functions described herein. Processor 1102 can include a single or multiple set of processors or multi-core processors. Moreover, processor 1102 can be implemented as an integrated processing system and/or a distributed processing system.

Computer device 1100 further includes a memory 1104, such as for storing local versions of applications being executed by processor 1102. Memory 1104 can include substantially any type of memory usable by a computer, such as random access memory (RAM), read only memory (ROM), tapes, magnetic discs, optical discs, volatile memory, non-volatile memory, and any combination thereof.

Further, computer device 1100 includes a communications component 1106 that provides for establishing and maintaining communications with one or more parties utilizing hardware, software, and services as described herein. Communications component 1106 may carry communications between components on computer device 1100, as well as between computer device 1100 and external devices, such as devices located across a communications network and/or devices serially or locally connected to computer device 1100. For example, communications component 1106 may include one or more buses, and may further include transmit chain components and receive chain components associated with a transmitter and receiver, respectively, operable for interfacing with external devices.

Additionally, computer device 1100 may further include a data store 1108, which can be any suitable combination of hardware and/or software, that provides for mass storage of information, databases, and programs employed in connection with aspects described herein. For example, data store 1108 may be a data repository for applications not currently being executed by processor 1102.

Computer device 1100 may optionally include a interface component 1110 operable to receive inputs from a user of computer device 1100, and further operable to generate outputs for presentation to the user. Interface component 1110 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, interface component 1110 may include one or more output devices, including but not limited to a display, a speaker, a haptic feedback mechanism, a printer, any other mechanism capable of presenting an output to a user, or any combination thereof. In another example, interface component 1110 can be an application programming interface (API) that can be accessed by one or more devices to perform functions on computer device 1100.

In addition, in the depicted example, computer device 1100 can optionally include one or more of a message component 1112, network area identifier determining component 1114, message routing component 1116, message receiving component 1118, or gateway presence determining component 1120. Thus, these components 1112, 1114, 1116, 1118, and/or 1120, which can be similar to other components described herein, can utilize processor 1102 to execute instructions associated therewith, memory 1104 to store information associated therewith, communications component 1106 to carry out communications, and/or the like, as described. In addition, it is to be appreciated that computer device 1100 can include additional or alternative components described herein.

Figure 12:
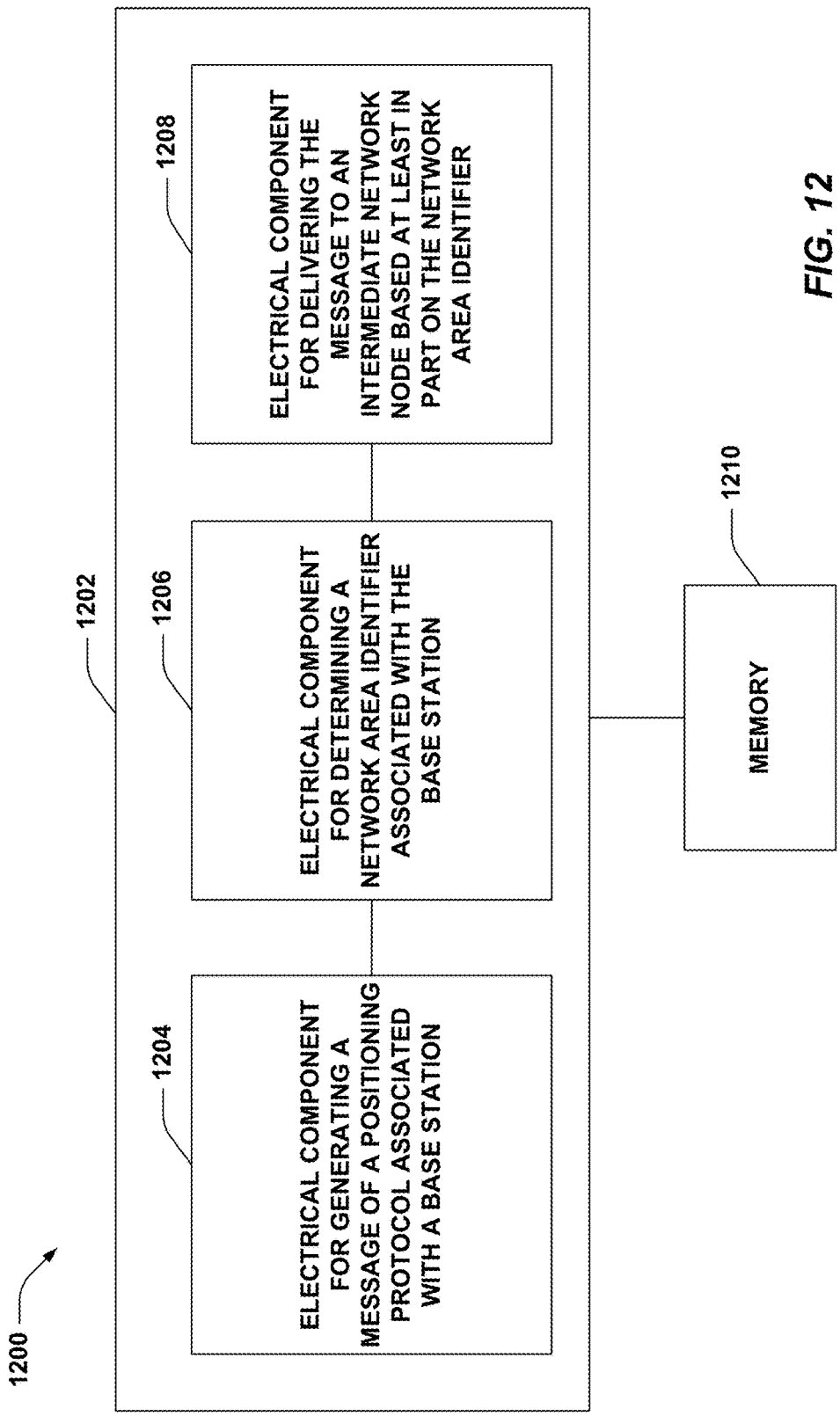
FIG. 12 illustrates an example system for routing messages of a positioning protocol.

With reference to FIG. 12, illustrated is a system 1200 that routes messages of a positioning protocol. For example, system 1200 can reside at least partially within an eSMLC, or other core network component, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for generating a message of a positioning protocol associated with a base station 1204. As described, the message can include one or more parameters related to positioning, timing, acknowledging a positioning update, and/or the like. Further, logical grouping 1202 can comprise an electrical component for determining a network area identifier associated with the base station 1206.

As described, for example, electrical component 1206 can store mappings of network area identifiers to base station identifiers (e.g., in memory 1210 or otherwise) for subsequently determining the network area identifier associated with an identifier of the base station. Moreover, logical grouping 1202 can include an electrical component for delivering the message to an intermediate network node based at least in part on the network area identifier 1208. For example, electrical component 1204 can include a message component 210, as described above. In addition, for example, electrical component 1206, in an aspect, can include a network area identifier determining component 212, as described above. Furthermore, electrical component 1208, in an aspect, can include a message routing component 214, as described. Additionally, system 1200 can include a memory 1210 that retains instructions for executing functions associated with the electrical components 1204, 1206, and 1208. While shown as being external to memory 1210, it is to be understood that one or more of the electrical components 1204, 1206, and 1208 can exist within memory 1210.

In one example, electrical components 1204, 1206, and 1208 can comprise at least one processor, or each electrical component 1204, 1206, and 1208 can be a corresponding module of at least one processor. Moreover, in an additional or alternative example, electrical components 1204, 1206, and 1208 can be a computer program product comprising a computer readable medium, where each electrical component 1204, 1206, and 1208 can be corresponding code.

Figure 13:
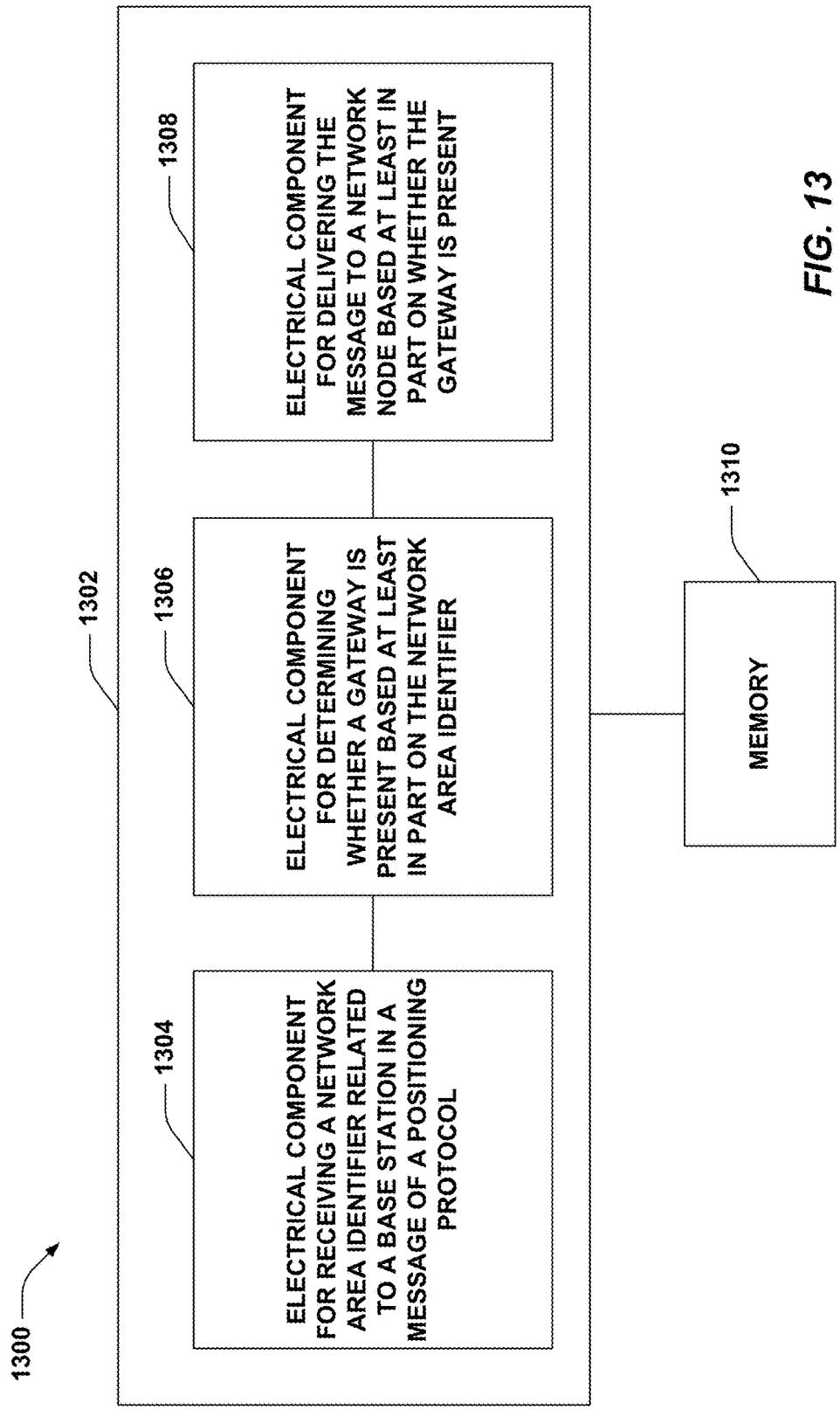
FIG. 13 illustrates an example system that routes received messages of a positioning protocol.

With reference to FIG. 13, illustrated is a system 1300 that routes messages of a positioning protocol. For example, system 1300 can reside at least partially within an MME, or other core network component, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for receiving a network area identifier related to a base station in a message of a positioning protocol 1304. Further, logical grouping 1302 can comprise an electrical component for determining whether a gateway is present based at least in part on the network area identifier 1306. As described, for example, electrical component 1306 can store mappings of network area identifiers to identifiers of gateways, and can determine presence of the gateway based at least in part on locating the network area identifier in the mappings.

Moreover, logical grouping 1302 can include an electrical component for delivering the message to a network node based at least in part on whether the gateway is present 1308. As described, where the gateway is present, electrical component 1308 can deliver the message to the gateway and can include an identifier of the base station in the message. Where the gateway is not present, for example, electrical component 1308 can deliver the message to the base station. For example, electrical component 1304 can include a message receiving component 310, as described above. In addition, for example, electrical component 1306, in an aspect, can include a gateway presence determining component 312, as described above. Furthermore, electrical component 1308, in an aspect, can include a message routing component 314, as described. Additionally, system 1300 can include a memory 1310 that retains instructions for executing functions associated with the electrical components 1304, 1306, and 1308. While shown as being external to memory 1310, it is to be understood that one or more of the electrical components 1304, 1306, and 1308 can exist within memory 1310.

In one example, electrical components 1304, 1306, and 1308 can comprise at least one processor, or each electrical component 1304, 1306, and 1308 can be a corresponding module of at least one processor. Moreover, in an additional or alternative example, electrical components 1304, 1306, and 1308 can be a computer program product comprising a computer readable medium, where each electrical component 1304, 1306, and 1308 can be corresponding code.

Figure 14:
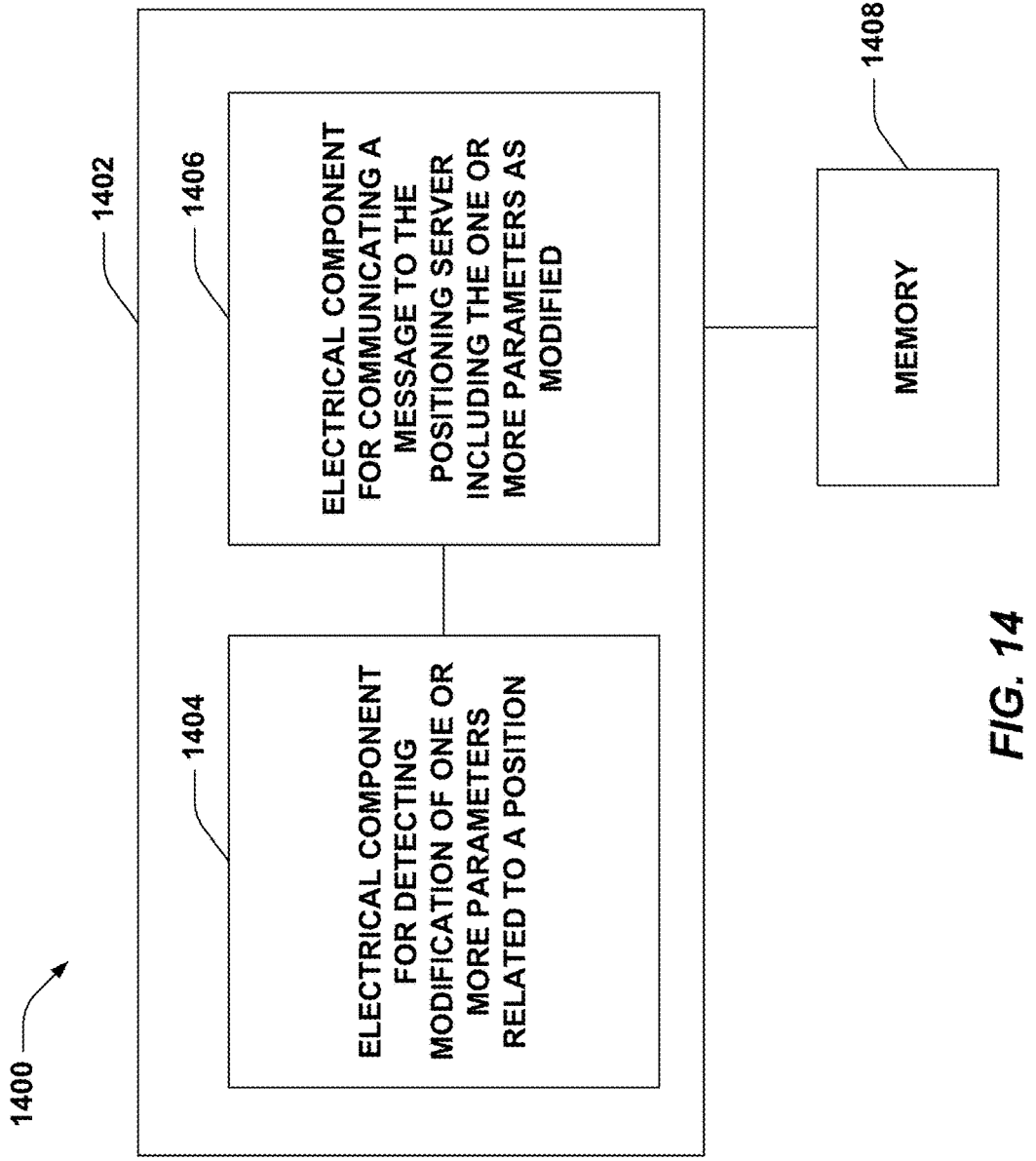
FIG. 14 illustrates an example system that updates positioning information.

With reference to FIG. 14, illustrated is a system 1400 that updates positioning information. For example, system 1400 can reside at least partially within a base station, mobile device, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for detecting modification of one or more parameters related to a position 1404. As described, electrical component 1404 can monitor parameters such as a location (e.g., GPS location), and/or the like.

Further, logical grouping 1402 can comprise an electrical component for communicating a message to the positioning server including the one or more parameters as modified 1406. As described, for example, electrical component 1406 can utilize one or more messages available in the positioning protocol for communicating the message. For example, in an aspect, electrical component 1404 can include configuration modification detecting component 410, as described above. In addition, for example, electrical component 1406, in an aspect, can include positioning server communicating component 412, as described above. Additionally, system 1400 can include a memory 1408 that retains instructions for executing functions associated with the electrical components 1404 and 1406. While shown as being external to memory 1408, it is to be understood that one or more of the electrical components 1404 and 1406 can exist within memory 1408.

In one example, electrical components 1404 and 1406 can comprise at least one processor, or each electrical component 1404 and 1406 can be a corresponding module of at least one processor. Moreover, in an additional or alternative example, electrical components 1404 and 1406 can be a computer program product comprising a computer readable medium, where each electrical component 1404 and 1406 can be corresponding code.

Figure 15:
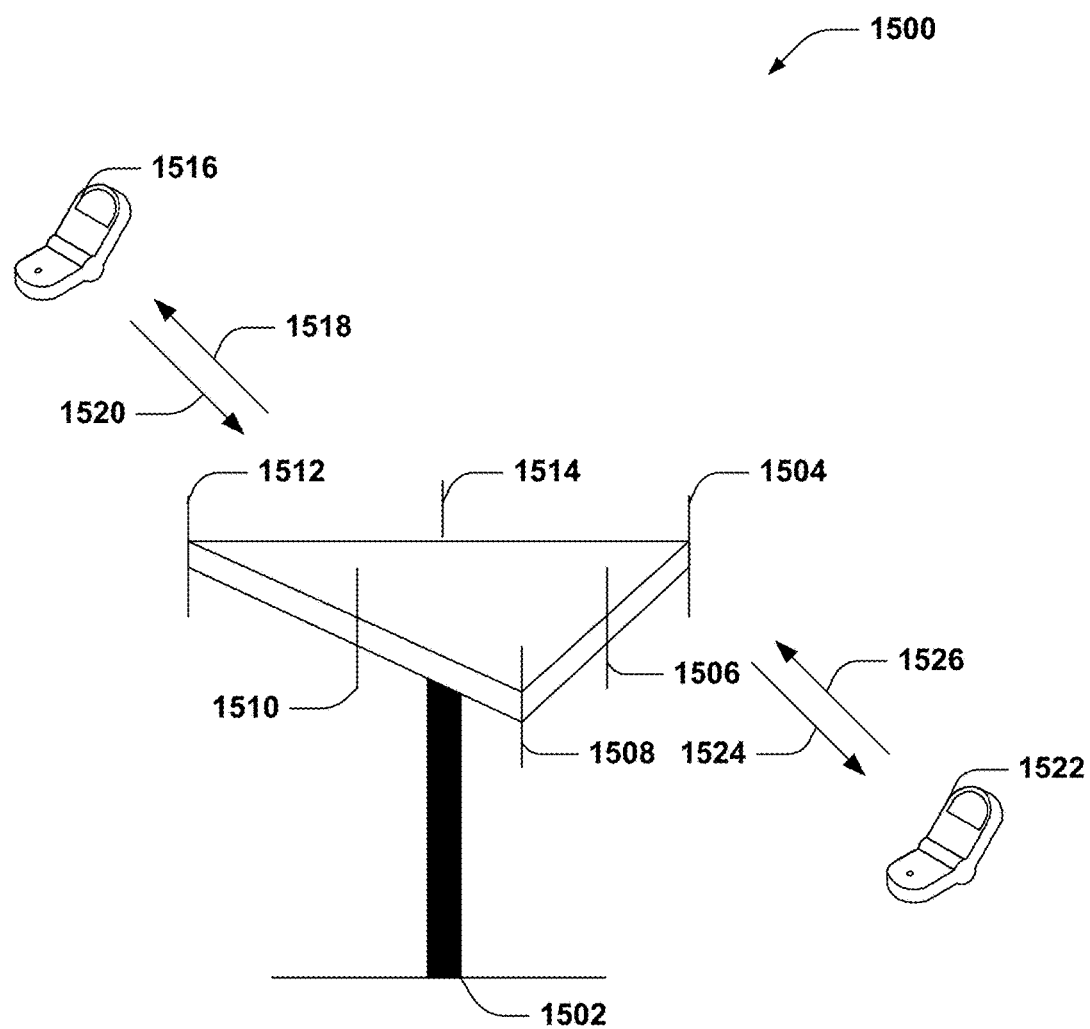
FIG. 15 illustrates an example wireless communication system in accordance with various aspects set forth herein.

Referring now to FIG. 15, a wireless communication system 1500 is illustrated in accordance with various embodiments presented herein. System 1500 comprises a base station 1502 that can include multiple antenna groups. For example, one antenna group can include antennas 1504 and 1506, another group can comprise antennas 1508 and 1510, and an additional group can include antennas 1512 and 1514. Two antennas are illustrated for each antenna group; however, more or fewer antennas can be utilized for each group. Base station 1502 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1502 can communicate with one or more mobile devices such as mobile device 1516 and mobile device 1522; however, it is to be appreciated that base station 1502 can communicate with substantially any number of mobile devices similar to mobile devices 1516 and 1522. Mobile devices 1516 and 1522 can be, for example, cellular phones, smart phones, laptops, handheld communication devices, handheld computing devices, satellite radios, global positioning systems, PDAs, and/or any other suitable device for communicating over wireless communication system 1500. As depicted, mobile device 1516 is in communication with antennas 1512 and 1514, where antennas 1512 and 1514 transmit information to mobile device 1516 over a forward link 1518 and receive information from mobile device 1516 over a reverse link 1520. Moreover, mobile device 1522 is in communication with antennas 1504 and 1506, where antennas 1504 and 1506 transmit information to mobile device 1522 over a forward link 1524 and receive information from mobile device 1522 over a reverse link 1526. In a frequency division duplex (FDD) system, forward link 1518 can utilize a different frequency band than that used by reverse link 1520, and forward link 1524 can employ a different frequency band than that employed by reverse link 1526, for example. Further, in a time division duplex (TDD) system, forward link 1518 and reverse link 1520 can utilize a common frequency band and forward link 1524 and reverse link 1526 can utilize a common frequency band.

Each group of antennas and/or the area in which they are designated to communicate can be referred to as a sector of base station 1502. For example, antenna groups can be designed to communicate to mobile devices in a sector of the areas covered by base station 1502. In communication over forward links 1518 and 1524, the transmitting antennas of base station 1502 can utilize beamforming to improve signal-to-noise ratio of forward links 1518 and 1524 for mobile devices 1516 and 1522. Also, while base station 1502 utilizes beamforming to transmit to mobile devices 1516 and 1522 scattered randomly through an associated coverage, mobile devices in neighboring cells can be subject to less interference as compared to a base station transmitting through a single antenna to all its mobile devices. Moreover, mobile devices 1516 and 1522 can communicate directly with one another using a peer-to-peer or ad hoc technology as depicted. According to an example, system 1500 can be a multiple-input multiple-output (MIMO) communication system.

Figure 16:
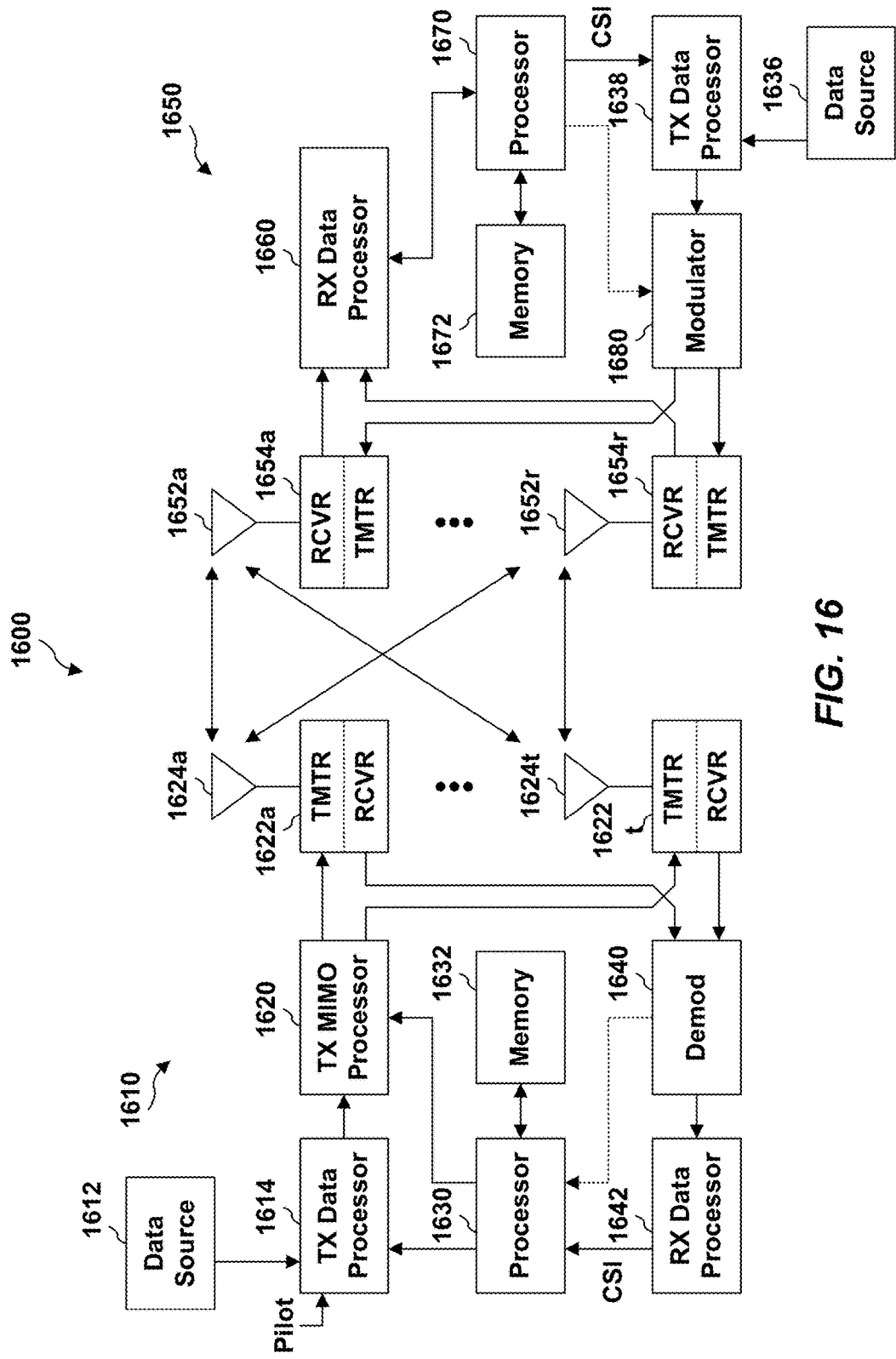
FIG. 16 illustrates an example wireless network environment that can be employed in conjunction with the various systems and methods described herein.

FIG. 16 shows an example wireless communication system 1600. The wireless communication system 1600 depicts one base station 1610 and one mobile device 1650 for sake of brevity. However, it is to be appreciated that system 1600 can include more than one base station and/or more than one mobile device, wherein additional base stations and/or mobile devices can be substantially similar or different from example base station 1610 and mobile device 1650 described below. In addition, it is to be appreciated that base station 1610 and/or mobile device 1650 can employ the systems (FIGS. 1-6, 10, and 12-15), computer devices, (FIG. 11), and/or methods (FIGS. 7-9) described herein to facilitate wireless communication there between. For example, components or functions of the systems and/or methods described herein can be part of a memory 1632 and/or 1672 or processors 1630 and/or 1670 described below, and/or can be executed by processors 1630 and/or 1670 to perform the disclosed functions.

At base station 1610, traffic data for a number of data streams is provided from a data source 1612 to a transmit (TX) data processor 1614. According to an example, each data stream can be transmitted over a respective antenna. TX data processor 1614 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1650 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1630.

The modulation symbols for the data streams can be provided to a TX MIMO processor 1620, which can further process the modulation symbols (e.g., for OFDM). TX MIMO processor 1620 then provides NT modulation symbol streams to NT transmitters (TMTR) 1622a through 1622t. In various embodiments, TX MIMO processor 1620 applies beamforming weights to the symbols of the data streams and to the antenna from which the symbol is being transmitted.

Each transmitter 1622 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1622a through 1622t are transmitted from NT antennas 1624a through 1624t, respectively.

At mobile device 1650, the transmitted modulated signals are received by NR antennas 1652a through 1652r and the received signal from each antenna 1652 is provided to a respective receiver (RCVR) 1654a through 1654r. Each receiver 1654 conditions (e.g., filters, amplifies, and downconverts) a respective signal, digitizes the conditioned signal to provide samples, and further processes the samples to provide a corresponding "received" symbol stream.

An RX data processor 1660 can receive and process the NR received symbol streams from NR receivers 1654 based on a particular receiver processing technique to provide NT "detected" symbol streams. RX data processor 1660 can demodulate, deinterleave, and decode each detected symbol stream to recover the traffic data for the data stream. The processing by RX data processor 1660 is complementary to that performed by TX MIMO processor 1620 and TX data processor 1614 at base station 1610.

The reverse link message can comprise various types of information regarding the communication link and/or the received data stream. The reverse link message can be processed by a TX data processor 1638, which also receives traffic data for a number of data streams from a data source 1636, modulated by a modulator 1680, conditioned by transmitters 1654a through 1654r, and transmitted back to base station 1610.

At base station 1610, the modulated signals from mobile device 1650 are received by antennas 1624, conditioned by receivers 1622, demodulated by a demodulator 1640, and processed by a RX data processor 1642 to extract the reverse link message transmitted by mobile device 1650. Further, processor 1630 can process the extracted message to determine which precoding matrix to use for determining the beamforming weights.

Processors 1630 and 1670 can direct (e.g., control, coordinate, manage, etc.) operation at base station 1610 and mobile device 1650, respectively. Respective processors 1630 and 1670 can be associated with memory 1632 and 1672 that store program codes and data. Processors 1630 and 1670 can also perform computations to derive frequency and impulse response estimates for the uplink and downlink, respectively.

Figure 17:
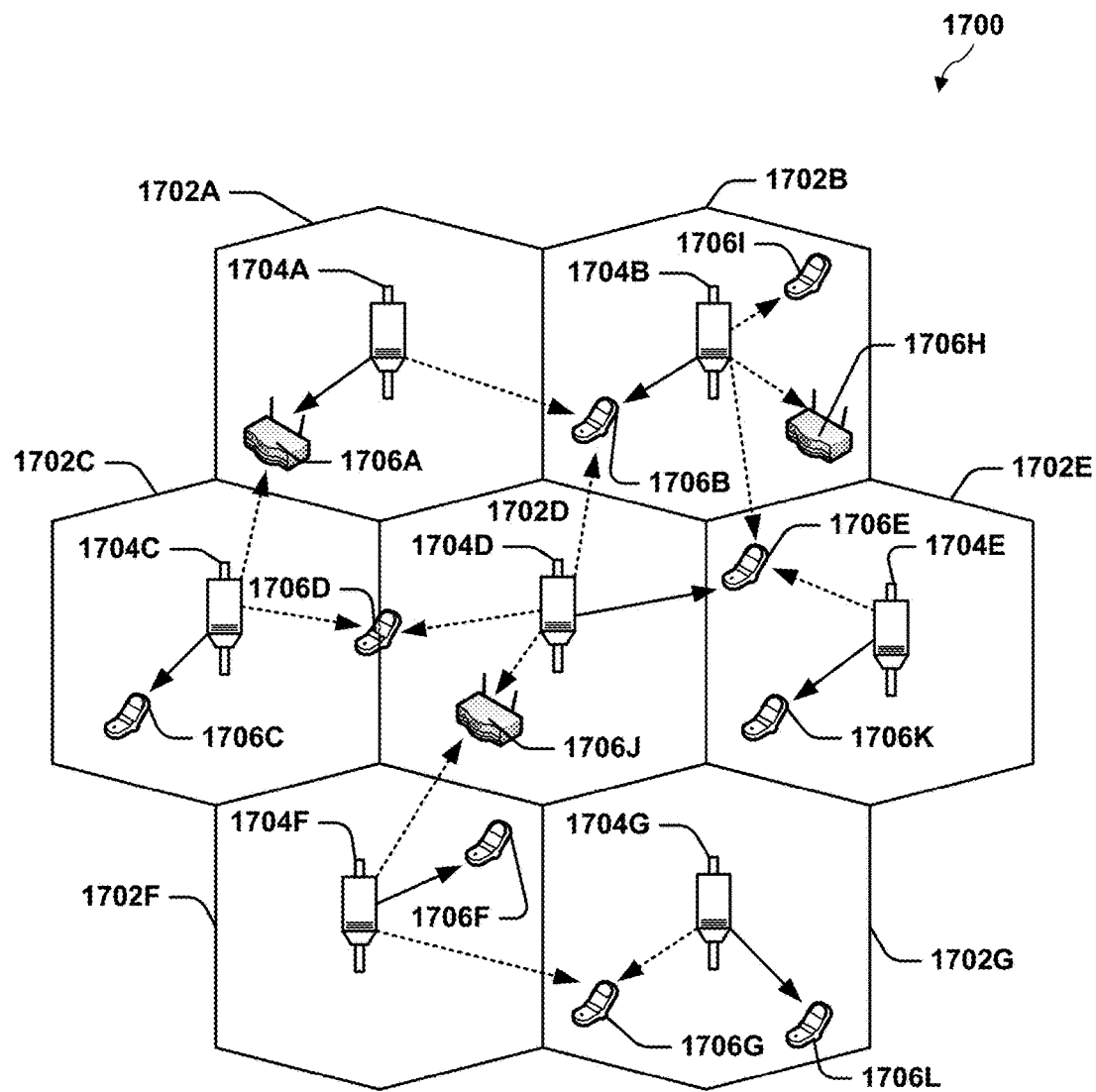
FIG. 17 illustrates a wireless communication system, configured to support a number of devices, in which the aspects herein can be implemented.

FIG. 17 illustrates a wireless communication system 1700, configured to support a number of users, in which the teachings herein may be implemented. The system 1700 provides communication for multiple cells 1702, such as, for example, macro cells 1702A-1702G, with each cell being serviced by a corresponding access node 1704 (e.g., access nodes 1704A-1704G). As shown in FIG. 17, access terminals 1706 (e.g., access terminals 1706A-1706L) can be dispersed at various locations throughout the system over time. Each access terminal 1706 can communicate with one or more access nodes 1704 on a forward link (FL) and/or a reverse link (RL) at a given moment, depending upon whether the access terminal 1706 is active and whether it is in soft handoff, for example. The wireless communication system 1700 can provide service over a large geographic region.

Figure 18:
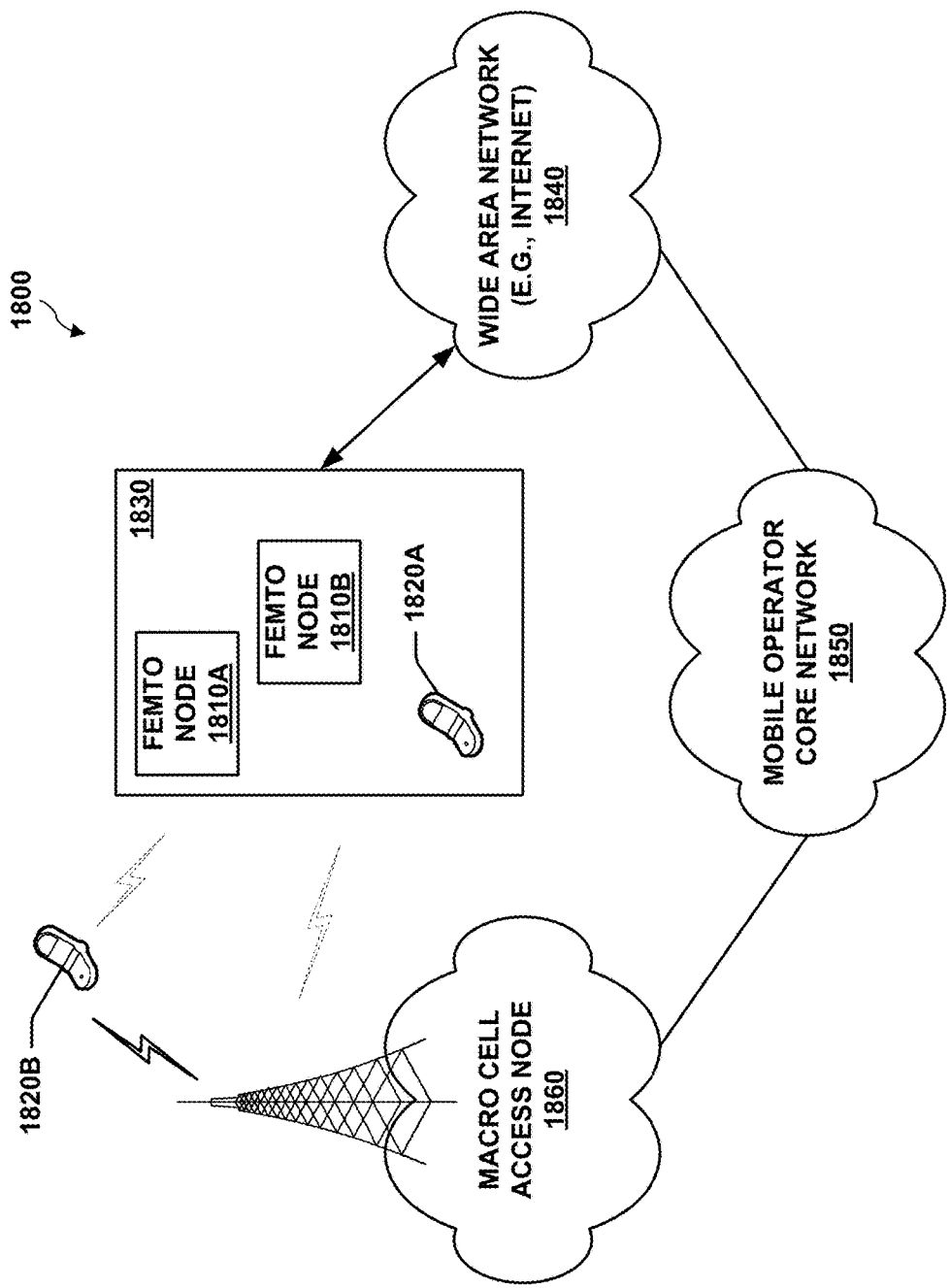
FIG. 18 illustrates an exemplary communication system to enable deployment of femtocells within a network environment.

FIG. 18 illustrates an exemplary communication system 1800 where one or more femto nodes are deployed within a network environment. Specifically, the system 1800 includes multiple femto nodes 1810A and 1810B (e.g., femtocell nodes or HeNB) installed in a relatively small scale network environment (e.g., in one or more user residences 1830). Each femto node 1810 can be coupled to a wide area network 1840 (e.g., the Internet) and a mobile operator core network 1850 via a digital subscriber line (DSL) router, a cable modem, a wireless link, or other connectivity means (not shown). As will be discussed below, each femto node 1810 can be configured to serve associated access terminals 1820 (e.g., access terminal 1820A) and, optionally, alien access terminals 1820 (e.g., access terminal 1820B). In other words, access to femto nodes 1810 can be restricted such that a given access terminal 1820 can be served by a set of designated (e.g., home) femto node(s) 1810 but may not be served by any non-designated femto nodes 1810 (e.g., a neighbor's femto node).

Figure 19:
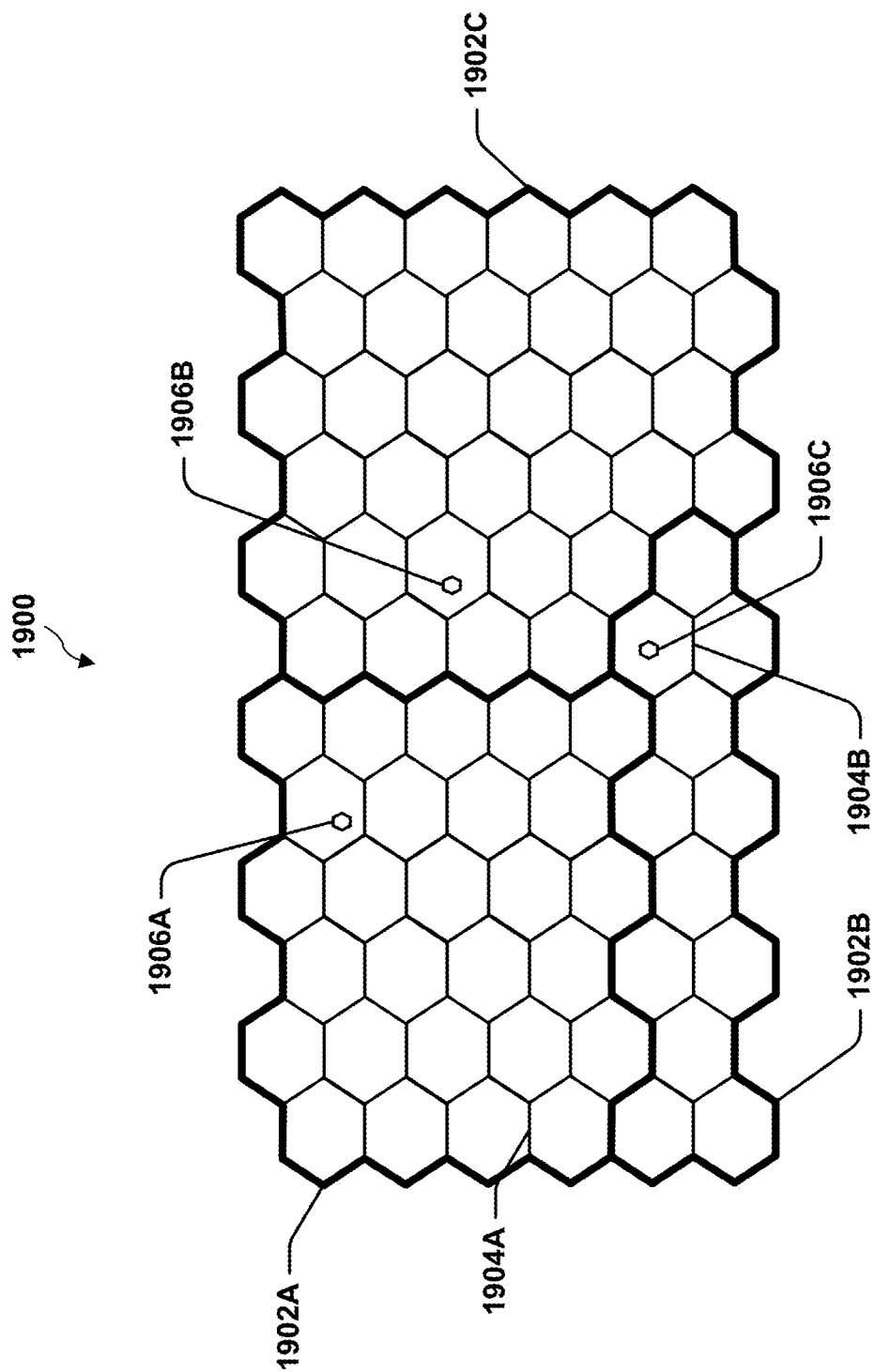
FIG. 19 illustrates an example of a coverage map having several defined tracking areas.

FIG. 19 illustrates an example of a coverage map 1900 where several tracking areas 1902 (or routing areas or location areas) are defined, each of which includes several macro coverage areas 1904. Here, areas of coverage associated with tracking areas 1902A, 1902B, and 1902C are delineated by the wide lines and the macro coverage areas 1904 are represented by the hexagons. The tracking areas 1902 also include femto coverage areas 1906. In this example, each of the femto coverage areas 1906 (e.g., femto coverage area 1906C) is depicted within a macro coverage area 1904 (e.g., macro coverage area 1904B). It should be appreciated, however, that a femto coverage area 1906 may not lie entirely within a macro coverage area 1904. In practice, a large number of femto coverage areas 1906 can be defined with a given tracking area 1902 or macro coverage area 1904. Also, one or more pico coverage areas (not shown) can be defined within a given tracking area 1902 or macro coverage area 1904.

Referring again to FIG. 18, the owner of a femto node 1810 can subscribe to mobile service, such as, for example, 3G mobile service, offered through the mobile operator core network 1850. In addition, an access terminal 1820 can be capable of operating both in macro environments and in smaller scale (e.g., residential) network environments. Thus, for example, depending on the current location of the access terminal 1820, the access terminal 1820 can be served by an access node 1860 or by any one of a set of femto nodes 1810 (e.g., the femto nodes 1810A and 1810B that reside within a corresponding user residence 1830). For example, when a subscriber is outside his home, he is served by a standard macro cell access node (e.g., node 1860) and when the subscriber is at home, he is served by a femto node (e.g., node 1810A). Here, it should be appreciated that a femto node 1810 can be backward compatible with existing access terminals 1820.

A femto node 1810 can be deployed on a single frequency or, in the alternative, on multiple frequencies. Depending on the particular configuration, the single frequency or one or more of the multiple frequencies can overlap with one or more frequencies used by a macro cell access node (e.g., node 1860). In some aspects, an access terminal 1820 can be configured to connect to a preferred femto node (e.g., the home femto node of the access terminal 1820) whenever such connectivity is possible. For example, whenever the access terminal 1820 is within the user's residence 1830, it can communicate with the home femto node 1810.

In some aspects, if the access terminal 1820 operates within the mobile operator core network 1850 but is not residing on its most preferred network (e.g., as defined in a preferred roaming list), the access terminal 1820 can continue to search for the most preferred network (e.g., femto node 1810) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1820 can limit the search for specific band and channel. For example, the search for the most preferred system can be repeated periodically. Upon discovery of a preferred femto node, such as femto node 1810, the access terminal 1820 selects the femto node 1810 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1810 that reside within the corresponding user residence 1830). In some implementations, a femto node can be restricted to not provide, for at least one access terminal, at least one of: signaling, data access, registration, paging, or service.

In some aspects, a restricted femto node (which can also be referred to as a Closed Subscriber Group HeNB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for updating positioning information in a wireless network, comprising:
   receiving, at a base station, one or more messages from a positioning server;
   detecting, by the base station, modification of one or more parameters related to a position of the base station; and
   communicating, by the base station, a message to the positioning server including the one or more parameters as modified to enable the positioning server to route messages of a positioning protocol to the base station.

2. A base station for updating positioning information in a wireless network, comprising:
   at least one processor of the base station configured to:
      receive one or more messages from a positioning server;

detect modification of one or more parameters related to a position of the base station; and communicate a message to the positioning server including the one or more parameters as modified to enable the positioning server to route messages of a positioning protocol to the base station; and a memory coupled to the at least one processor.

3. A base station for updating positioning information in a wireless network, comprising:

means for detecting modification, at the base station, of one or more parameters related to a position of the base station; and means for communicating a message to a positioning server including the one or more parameters as modified to enable the positioning server to route messages of a positioning protocol to the base station.

4. A computer program product for updating positioning information in a wireless network, comprising:

a non-transitory computer-readable medium comprising:

code for causing at least one computer of a base station to process one or more messages from a positioning server;

code for causing the at least one computer to detect modification of one or more parameters related to a position of the base station; and code for causing the at least one computer to communicate a message to the positioning server including the one or more parameters as modified to enable the positioning server to route messages of a positioning protocol to the base station.

5. A base station for updating positioning information in a wireless network, comprising:

a configuration modification detecting component of the base station for determining modification of one or more parameters related to a position of the base station; and a positioning server communicating component for transmitting a message to a positioning server including the one or more parameters as modified to enable the positioning server to route messages of a positioning protocol to the base station.

6. The method of claim 1, wherein the receiving one or more messages comprises receiving a message comprising a base station identifier.

7. The method of claim 1, wherein the receiving one or more messages comprises receiving the one or more messages via an intermediate network node.

8. The method of claim 7, wherein the intermediate network node is a mobility management entity (MME).

9. The method of claim 1, wherein the receiving one or more messages comprises receiving the one or more messages via an intermediate network node and a gateway.

10. The method of claim 1, wherein the base station is a home evolved Node B (HeNB).

11. The base station of claim 2, wherein the one or more messages received from a positioning server includes a base station identifier.

12. The base station of claim 2, wherein the one or more messages received from a positioning server comprises receiving the one or more messages via an intermediate network node.

13. The base station of claim 12, wherein the intermediate network node is a mobility management entity (MME).

14. The base station of claim 2, wherein the one or more messages received from a positioning server comprises receiving the one or more messages via an intermediate network node and a gateway.

15. The base station of claim 2, wherein the base station is a home evolved Node B (HeNB).

16. The computer program product of claim 4, wherein the one or more messages received from a positioning server includes a base station identifier.

17. The computer program product of claim 4, wherein the one or more messages received from a positioning server comprises receiving the one or more messages via an intermediate network node.

18. The computer program product of claim 17, wherein the intermediate network node is a mobility management entity (MME).

19. The computer program product of claim 4, wherein the one or more messages received from a positioning server comprises receiving the one or more messages via an intermediate network node and a gateway.

20. The computer program product of claim 4, wherein the base station is a home evolved Node B (HeNB).

* * * * *